(12) United States Patent
Nakamura et al.

(10) Patent No.: US 6,470,697 B2
(45) Date of Patent: Oct. 29, 2002

(54) AIR-CONDITIONING SYSTEM FOR VEHICLES

(75) Inventors: Hiroki Nakamura, Chiryu (JP); Hiroshi Nonoyama, Toyota (JP); Yoshimitsu Inoue, Chiryu (JP); Yuji Takeo, Toyoake (JP); Mitsuyo Oomura, Hekinan (JP); Eiji Takahashi, Toyohashi (JP); Toshinobu Homan, Obu (JP); Osamu Kasebe, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/921,739

(22) Filed: Aug. 3, 2001

(65) Prior Publication Data

US 2001/0049943 A1 Dec. 13, 2001

Related U.S. Application Data

(63) Continuation-in-part of application No. 09/843,969, filed on Apr. 27, 2001.

(30) Foreign Application Priority Data

| | | | |
|---|---|---|---|
| Apr. 27, 2000 | (JP) | ...... | 2000-128252 |
| Aug. 4, 2000 | (JP) | ...... | 2000-237347 |
| Dec. 22, 2000 | (JP) | ...... | 2000-391122 |
| Apr. 11, 2001 | (JP) | ...... | 2001-113075 |
| Jun. 1, 2001 | (JP) | ...... | 2001-166915 |

(51) Int. Cl.$^7$ ................................................. G05D 23/32
(52) U.S. Cl. ........................................... 62/157; 62/231
(58) Field of Search ................................... 62/157, 231

(56) References Cited

U.S. PATENT DOCUMENTS

| | | | | |
|---|---|---|---|---|
| 4,384,461 A | * | 5/1983 | Kurtz | .......................... 377/20 |
| 4,537,038 A | * | 8/1985 | Alsenz et al. | .................. 417/12 |
| 4,750,672 A | * | 6/1988 | Beckey et al. | ............... 237/2 B |
| 5,366,003 A | * | 11/1994 | Raso | .......................... 165/202 |
| 5,408,841 A | * | 4/1995 | Fujiwara et al. | ............... 62/192 |
| 6,226,967 B1 | * | 5/2001 | Staiger | ....................... 56/14.5 |

FOREIGN PATENT DOCUMENTS

JP A-11-198644 7/1999

* cited by examiner

Primary Examiner—William E. Tapolcai
(74) Attorney, Agent, or Firm—Harness, Dickey & Pierce, PLC

(57) ABSTRACT

When an after-evaporation temperature TE remains below the wet-bulb temperature Twet, the compressor 231 is intermittently operated for a predetermined time after the elapse of a first time To from compressor 231 stopping. On the other hand, when the after-evaporation temperature TE is higher than the wet-bulb temperature Twet, the intermittent operation mode stops. This reduces dispersion of offensive smells from the evaporator.

13 Claims, 28 Drawing Sheets

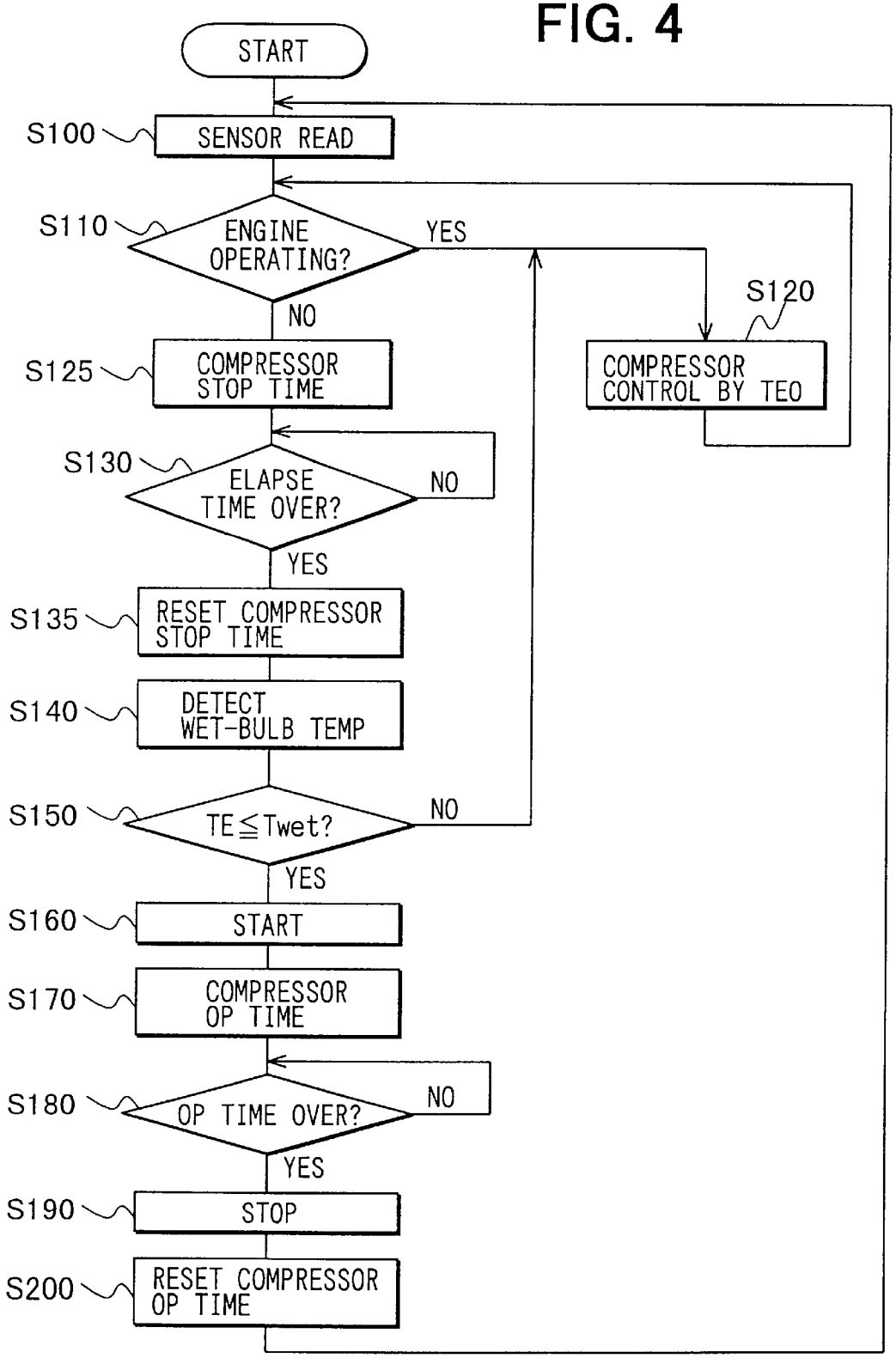

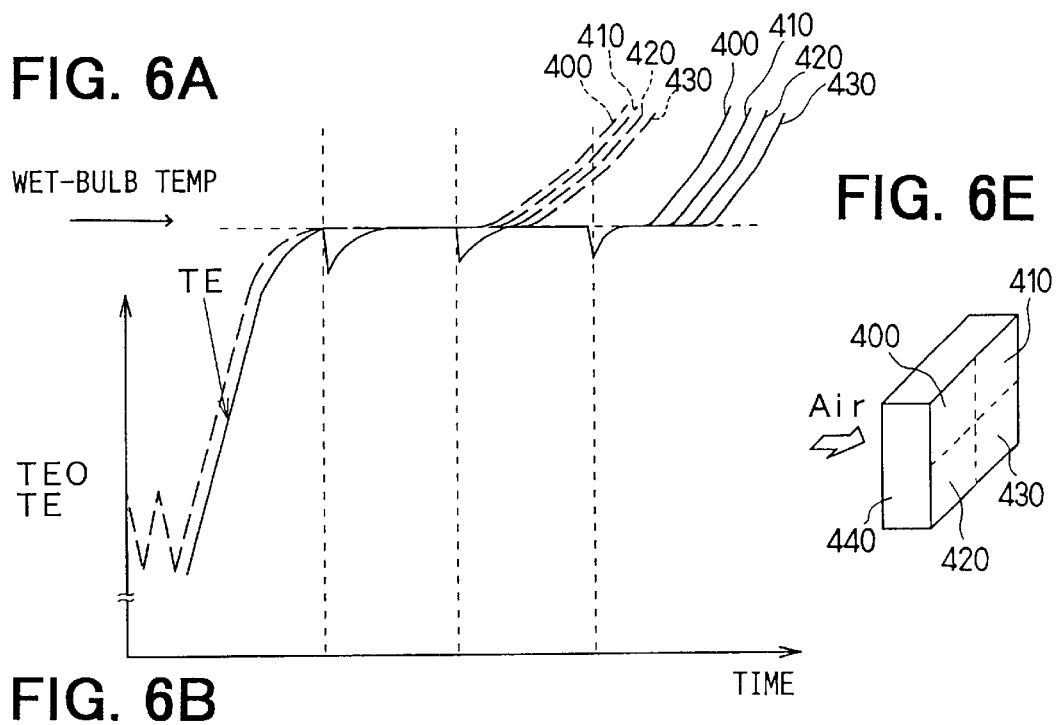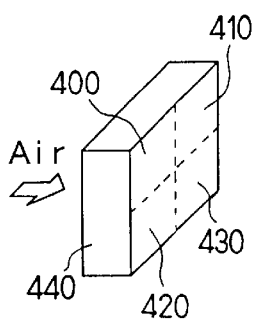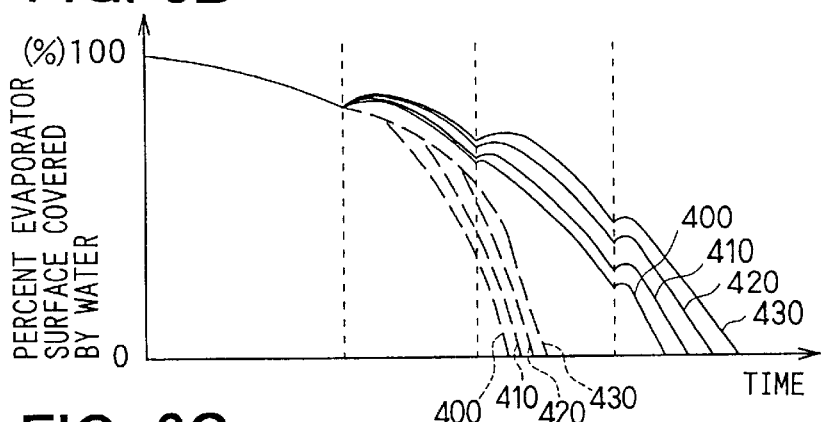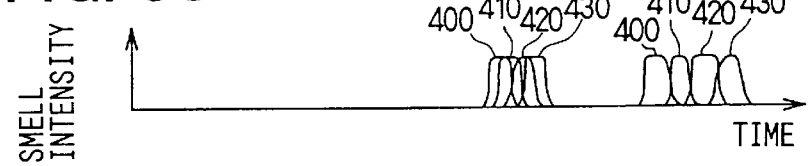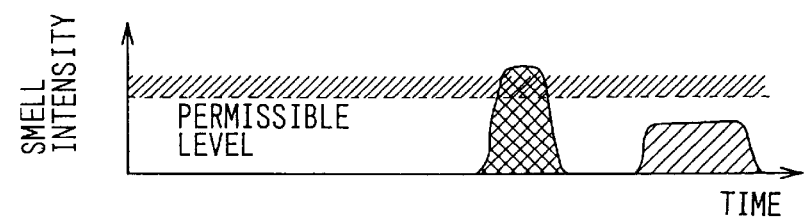

AIR-CONDITIONING SYSTEM FOR VEHICLES

CROSS-REFERENCE TO RELATED APPLICATION

The present invention is a continuation-in-part from U.S. patent application Ser. No. 09/843,969 filed on Apr. 27, 2001, and is related to Japanese patent application Nos. 2000-128252 filed on Apr. 27, 2000, 2000-237347 filed on Aug. 4, 2000, 2000-391122 filed on Dec. 22, 2000, 2001-113075 filed on Apr. 11, 2001, and 2001-166915 filed on Jun. 1, 2001, the contents of which are incorporated herein by reference.

FIELD

This invention relates to a vehicle air-conditioning system, and more particularly, to an vehicle air-conditioning system useable in a hybrid vehicle and a economy-run vehicle.

BACKGROUND

A vehicle air-conditioning compressor is generally driven by an engine, and in the case of a hybrid vehicle and an economy-run vehicle, the compressor will stop if the engine stops even when the air conditioning system is ON. The surface of the evaporator commonly has debris that emits offensive smells (perfume, new vehicle trim, cigarettes). Usually, these offensive smells are covered with condensate that holds them to the surface of the evaporator. As such, they do not scatter into the vehicle interior.

However, if the compressor stops operating, the condensate holding the particles to the evaporator evaporates, and therefore offensive smells leave the evaporator with the air-conditioned fresh air into the vehicle interior. According to JP-A No. Hei 11-198644, the compressor stops until offensive smells are detected, thereafter being restarted to thereby prevent offensive smells from entering the vehicle interior. Furthermore, the compressor operates until the air temperature passing the evaporator lowers to a predetermined value, and then is stopped again. However, the compressor should operate until immediately before the occurrence of an offensive smell, and also until the temperature of the air after passing through the evaporator lowers to the predetermined value. Because of this, it is difficult to decrease compressor speed.

SUMMARY

In view of the above-described disadvantages, the present invention provides an air-conditioning system having a compressor which compresses refrigerant, and an evaporator mounted inside of an air-conditioner casing forming an air passage through which the fresh air is blown into the vehicle interior, to thereby cool the air by evaporating the refrigerant. According to this invention, the air-conditioning system has a first clock means which measures time from compressor stop, and a second clock means which measures time after compressor start, so that the compressor will start when the time measured by the first clock means after compressor stop has reached a first predetermined time. The compressor operates until the time measured by the second clock means reaches a second predetermined time which is shorter than the first predetermined time.

The flow velocity of the refrigerant at which the ratio of surface sweating (the velocity at which the surface of the evaporator dries) can be decreased by the short-time flow of the refrigerant in the evaporator, thereby keeping offensive smells covered with condensate. Furthermore, since the compressor is operated after the lapse of the first predetermined time To after the compressor has been stopped, the rate of operation of the compressor can be lowered.

In another aspect of the invention, the compressor and the evaporator are mounted inside of the air-conditioner casing forming an air passage through which the fresh air is blown into the vehicle interior, thereby cooling the air by evaporating the refrigerant. According to this invention, the air-conditioning system has a first clock means which measures time from compressor stop, and a second clock means which measures time after the start of the compressor. An intermittent operation mode is executed to perform the compressor on-off operation to stop the compressor until the compressor, after stopping, will be kept stopped until a time measured by the first clock means reaches a first predetermined time, and thereafter to operate the compressor until the time measured by the second clock means reaches a second predetermined time that is shorter than the first predetermined time.

Thus, the rate of evaporation (the rate at which the surface of the evaporator dries) is reduced by the short-time flow of the refrigerant to the evaporator. Therefore, offensive smells are covered with condensate for a long time.

In another aspect, the intermittent operation mode stops when the air passing the evaporator exceeds the wet-bulb temperature of the evaporator. When the temperature of the air flowing through the evaporator has exceeded the wet-bulb temperature of the evaporator, the offensive smells usually have scattered. Therefore, the rate of operation of the compressor is reduced to reduce fuel consumption by stopping the intermittent operation mode when the temperature of the air after passing the evaporator exceeds the wet-bulb temperature.

The temperature of the air passing the evaporator sometimes remains below the wet-bulb temperature depending on the operating condition of the air-conditioning system. As such, in another aspect, when the operation frequency of the compressor has reached a specific frequency after starting the intermittent operation mode, the intermittent operation mode will stop. Prolonged continuous execution of the intermittent operation mode, therefore, can be prevented.

Next, In another aspect, the first predetermined time may be increased according to an increase in the humidity of air introduced into the air-conditioner casing.

In another aspect, the first predetermined time To may be increased according to an increase in air humidity introduced into the air-conditioner casing.

In another aspect, the first predetermined time To may be increased according to a decrease in the volume of air flowing in the air-conditioner casing.

In another aspect, the first predetermined time To in the inside air circulation mode in which the inside air of the vehicle is introduced into the air-conditioner casing may be increased as compared with that in the outside air introduction mode in which the outside air is introduced into the air-conditioner casing.

Furthermore, in another aspect, the first predetermined time To may be decreased according to an increase in vehicle speed, in the outside air introduction mode in which the outside air is introduced into the air-conditioner casing.

In another aspect, the first predetermined time To may be increased according to an increase in the amount of solar radiation entering the vehicle interior in the inside air circulation mode in which the inside air of the vehicle interior is introduced into the air-conditioner casing.

When the compressor is driven by the driving source, it is desirable to stop the intermittent operation mode when stopping the driving source as stated in claim 11 of this invention.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein:

FIG. 4 is a flowchart describing the air-conditioning system (first embodiment);

FIG. 6A is a graph showing a relation between the after-evaporation wet-bulb temperature TE and time;

FIG. 6B is a graph showing a relation between the rate of wetting of the evaporator surface and time;

FIG. 6C is a graph showing a relationship between the intensity of offensive smell and time;

FIG. 6D is a graph showing four kinds of intensities of offensive smell shown in FIG. 6C;

FIG. 6E is a schematic view of an evaporator showing places of measurements shown in FIGS. 6A–6C for the present invention;

DETAILED DESCRIPTION

FIRST EMBODIMENT

Figure 1:
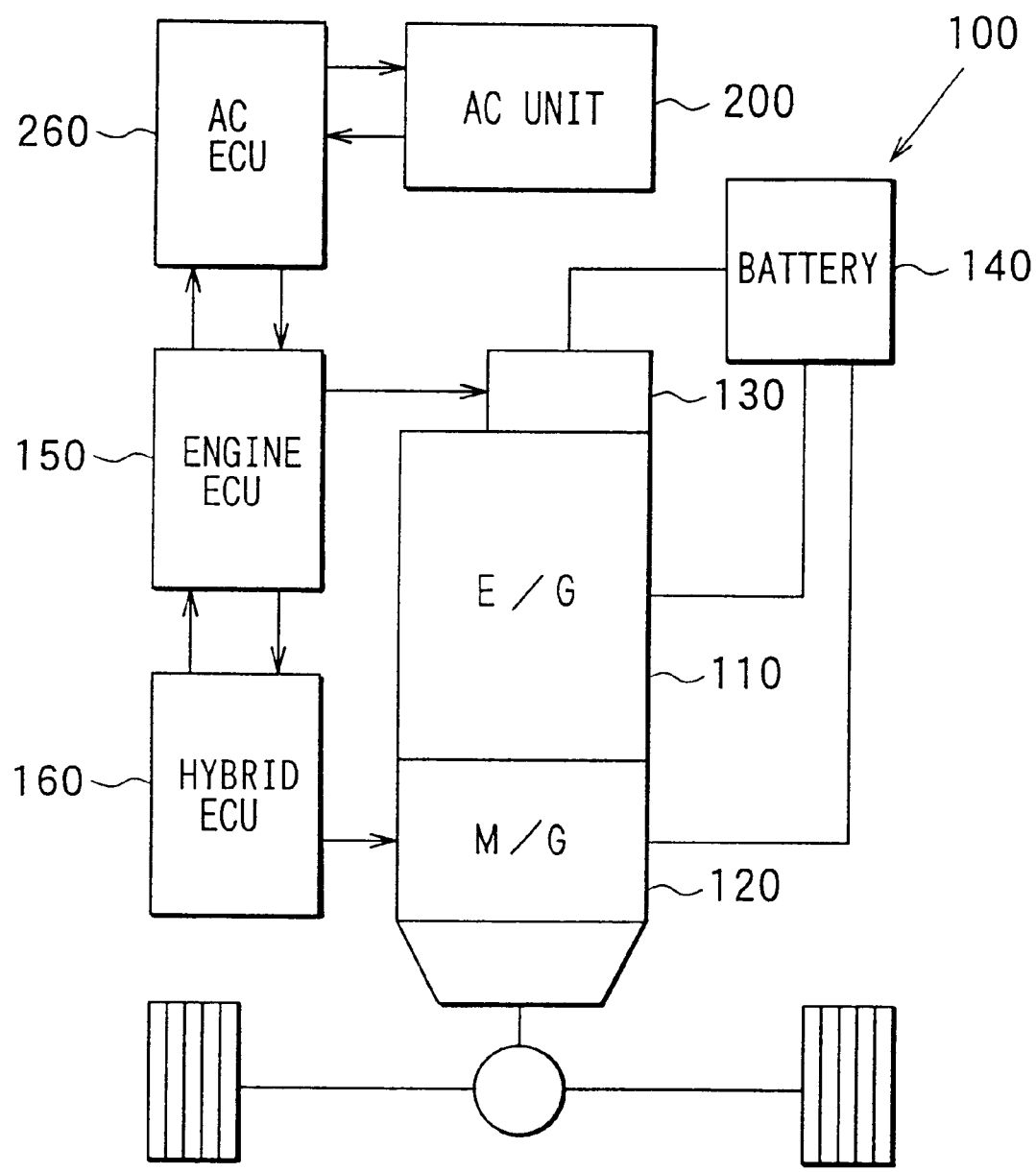
FIG. 1 is a schematic view of a hybrid vehicle to which an air-conditioning system (first embodiment)

In a first embodiment, as shown in FIG. 1, the invention is used with a hybrid vehicle 100. Vehicle 100 is comprised of an engine (internal combustion engine) 110 for driving the vehicle; a motor (motor generator) 120 having both a motor function as a source of driving force and a generating function; an engine control 130 comprising a starting motor for starting the engine 110, an ignition system, and a fuel injection system; a battery (secondary battery) 140 for supplying the electric power to the motor 120 and the engine control 130; an electronic control unit (EECU) 150 for controlling the engine control unit 130; and an electronic control unit (MECU) 160 for controlling the motor 120 through EECU 150.

In this embodiment, the engine 110 and the motor 120 are controlled based on various vehicle information such as the driving state of the vehicle and the charged condition of the battery 140. Concretely speaking, the vehicle is operated by power from engine 110, or by power of both engine 110 and motor 120, or by power generated (regenerative braking) by the motor 120.

Figure 2:
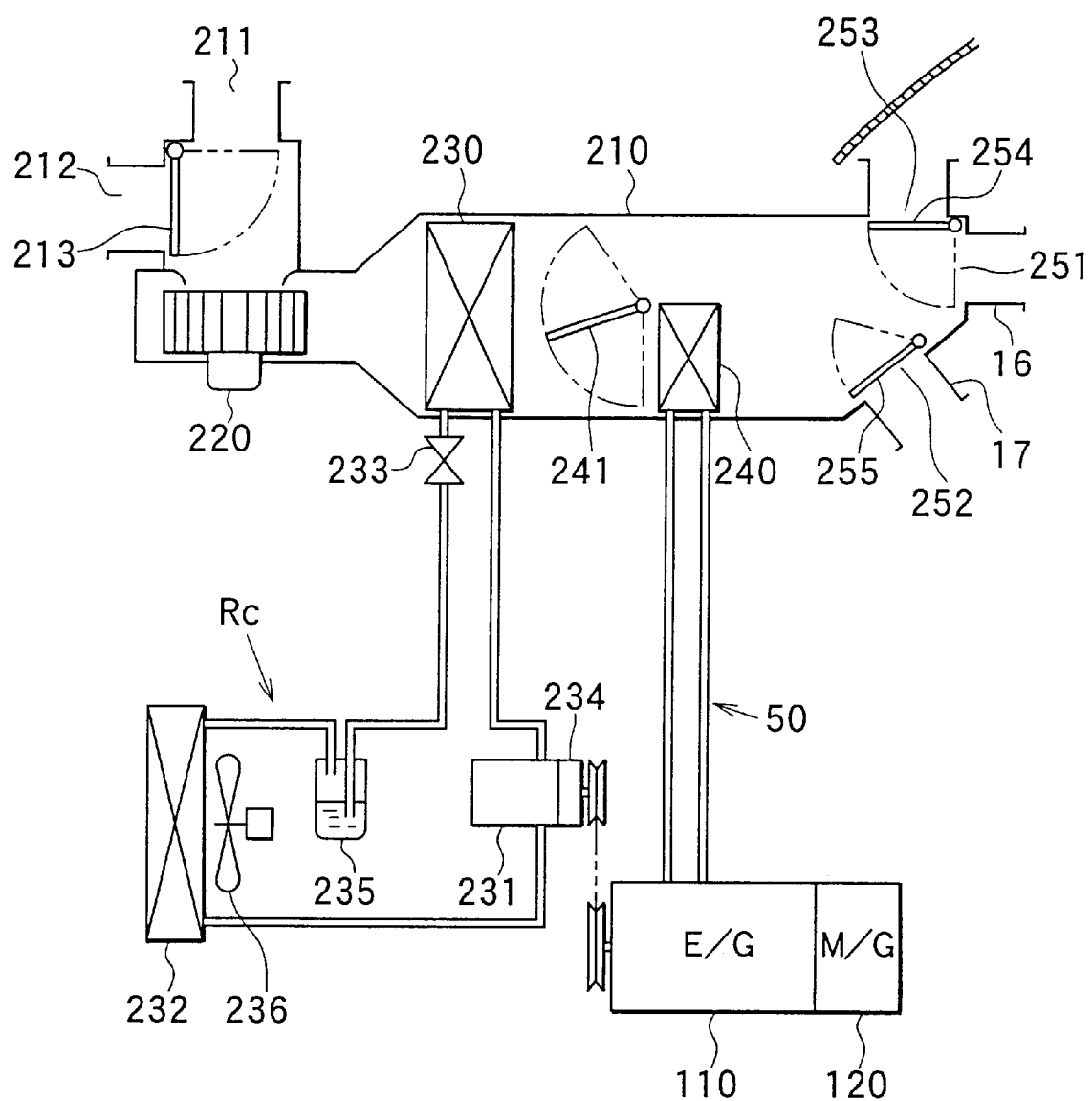
FIG. 2 is a schematic view of the air-conditioning system (first embodiment)
Figure 3:
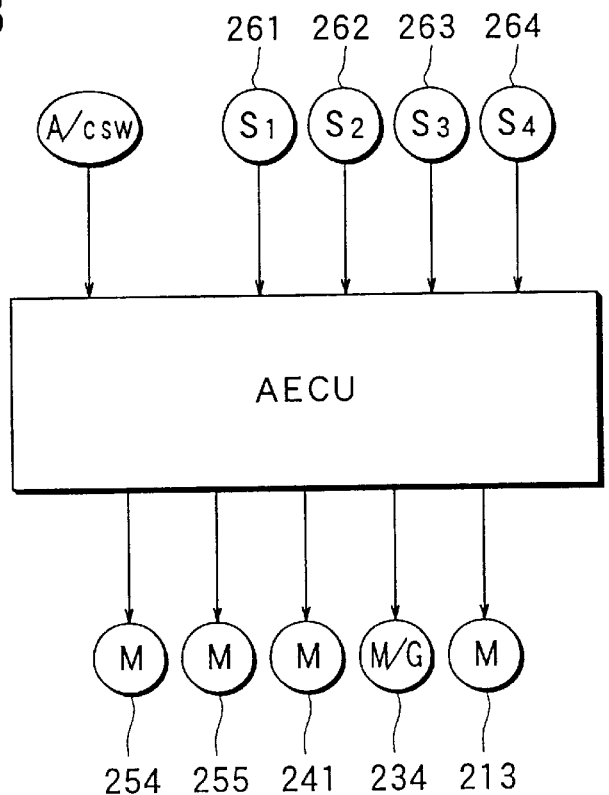
FIG. 3 is a schematic view of a control system of the air-conditioning system (first embodiment)

FIG. 2 is a schematic view of an air-conditioning system 200, in which 210 denotes an air-conditioner a resin casing (polypropylene in this embodiment) which forms an air passage blowing air into the vehicle interior. At the maximum upstream location of the air-conditioned air flow of the air-conditioner casing 210 is an outside air inlet port 211 at which the outside air is drawn into the air-conditioner casing 210, and an inside air inlet port 212 at which the inside air is drawn into the air-conditioner casing 210. Both the inlet ports 211 and 212 are controlled to open and close with an inside-outside air changeover door 213.

Numeral 220 refers to a centrifugal fan for supplying air, and numeral 230 is an evaporator for cooling the air-conditioned air. Downstream of the air-conditioned air flow of the evaporator 230, a heater core 240 is located to heat the air-conditioned air by using cooling water from the engine 110 as a heat source. Then, numeral 241 denotes an air mixing door for adjusting the temperature of air blown into the vehicle interior by adjusting the air-conditioned air (cold air) passing through the evaporator 230, the volume of air passing through the heater core 240 and the volume of air flowing around the heater core 240.

Numeral 251 denotes a face air outlet where the air-conditioned air (the temperature of which has been controlled by the air mixing door 241) is blown out to the head area of the vehicle's occupants. Numeral 252 denotes a foot air outlet at which the temperature-controlled air-conditioned air is blown out to the foot area of the vehicle's occupants. And, numeral 253 denotes a defroster air outlet at which the temperature-controlled air-conditioned air is blown out to the windshield glass.

Numeral 254 is a first blow-out mode door which opens and closes to switch between the face air outlet 251 and the defroster air outlet 252. Numeral 255 is a second blow-out mode door which opens and closes the foot air outlet 252. By controlling these air blow-out mode doors 254 and 255, the face mode for supplying the air-conditioned air to the head area of the vehicle's occupants, the foot mode for supplying the air-conditioned air to the foot area of the vehicle's occupants, and the defroster mode for supplying the air-conditioned air to the windshield glass are performed.

The evaporator 230 is a heat exchanger on the low-pressure side of a steam compression type refrigeration cycle (hereinafter referred to as the refrigeration cycle) Rc in which the refrigerating capacity can be fully performed through the evaporation of refrigerant. The refrigeration cycle, as is well known, includes the compressor 231 for compressing the refrigerant, a condenser 232 for cooling (condensing) the refrigerant by heat exchange between the air and the refrigerant compressed by the compressor 231, a pressure reducer 233 for the pressure of the refrigerant cooled by the condenser 232, and the evaporator 230.

In this embodiment, the compressor 231 is operated by engine 110 through an electromagnetic clutch (clutch means) 234 which intermittently transmits the driving force, and a V belt (not shown). When engine 110 is stopped by a demand on the vehicle side (EECU 150 and MECU 160 side), the electromagnetic clutch 234 stops the compressor 231 even when the electromagnetic clutch 234 is enabling transmission of driving force.

Numeral 235 represents a receiver which separates the refrigerant flowing out from condenser 232, to an air-phase refrigerant and a liquid-phase refrigerant, storing excess refrigerant. Numeral 236 denotes a condenser fan which supplies cool air to the condenser 232.

The air-conditioning system, including the inside-outside air changeover door 213, the fan 220, the electromagnetic clutch 234, the condenser fan 236, the air mixing door 241, and the blow-out mode doors 254 and 255, is controlled by an electronic control unit (AECU) for the air-conditioning system 260 (see FIG. 1).

The AECU 260 is supplied with signals from such air-conditioning sensors as an inside temperature sensor (inside temperature detecting means) 261 which detects the temperature of inside air, an outside temperature sensor (outside temperature detecting means) 262 which detects the temperature of outside air, an after-evaporation sensor (temperature detecting means) 263 which detects the air-conditioned air temperature immediately after passing through the evaporator 230, and a humidity sensor (humidity detecting means) 264 which detects the relative humidity of inside air.

Next, the characteristic operation of this embodiment (AECU 260) will be described with reference to the flowchart shown in FIG. 4.

When the starting switch (A/C switch) of the air-conditioning system is turned on, the fan 220 is operated, also turning on the electromagnetic clutch 234. At this time, almost simultaneously, detected values of the air-conditioning sensors 261 to 264 are read in (S100). Then, whether or not the engine 110 is operating is determined according to a signal from the EEC 150. When the engine 110 is operating, the electromagnetic clutch 234 is on-off controlled (S120) so that the detected temperature of the after-evaporation sensor 263 (hereinafter referred to as the after-evaporation temperature TE) is a target after-evaporation temperature TEO. In this embodiment, a 1° C. hysteresis has been set for the target after-evaporation temperature TEO. Concretely, the hysteresis has been set at 3° C.–4° C. when the determination is YES at S110, and at 25° C.–26° C. when the determination is NO at S150.

On the other hand, when the engine is stopped, an elapsed time is measured with reference to the time the engine 110 stopped. That is, from the time the compressor 231 stopped, according to a signal from the EECU 150, it is determined whether or not the elapsed time exceeds a first predetermined time (hereinafter referred to the predetermined elapsed time To). When the elapsed time exceeds the predetermined elapsed time, the measured compressor stop time is reset at S135, and thereafter the wet-bulb temperature Twet of the evaporator 230 is detected at S140.

In this embodiment, the elapsed time To is about 30 seconds, and the later-described required operation time Ts is about 1 second. The elapsed time To and the time required for operation Ts vary with the size (surface area) of the evaporator 230 and the air temperature flowing into the evaporator 230.

The wet-bulb temperature Twet is the surface temperature of the evaporator 230 with the surface of the evaporator 230 wet with condensate. While the surface of the evaporator 230 is wet with condensate, the after-evaporation temperature TE is below the wet-bulb temperature Twet. The wet-bulb temperature Twet is determined by the temperature (dry-bulb temperature) and humidity (relative humidity) of the air (suction air) flowing into the evaporator 230. And, in this embodiment, in the inside air circulation mode in which the inside air is introduced, the wet-bulb temperature Twet is computed based on detected values from the inside temperature sensor 261 and the humidity sensor 264 and the wet air diagram shown in FIG. 5 pre-stored in the ROM. Also, in the outside air introduction mode in which the outside air is introduced, the wet-bulb temperature Twet is the after-evaporation temperature TE after the lapse of a specific time (30 seconds in this embodiment) after the compressor 231 (engine 110) is stopped.

Figure 5:
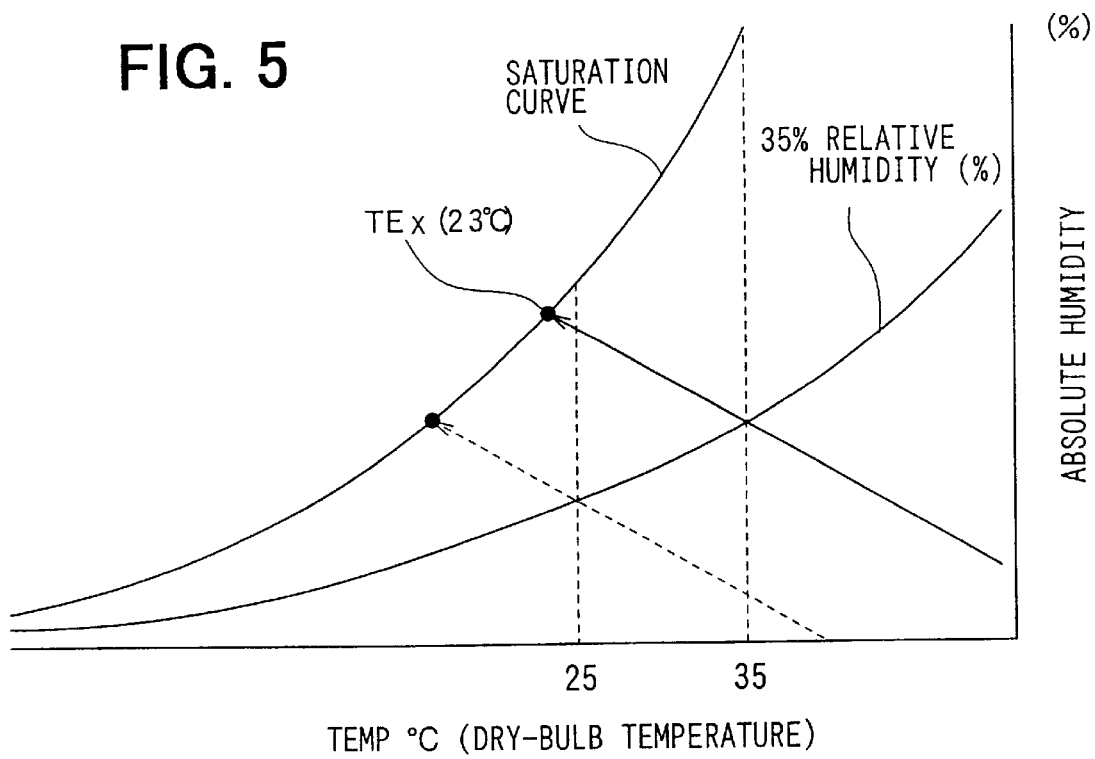
FIG. 5 is a wet air diagram according to the present invention.

When the temperature (dry-bulb temperature) of the air (suction air) flowing into the evaporator 230 is 35° C. and the relative humidity is 35%, the wet-bulb temperature Twet using FIG. 5 is the temperature TEx of 23° C. corresponding to a point of intersection TEx of the isenthalpic curve and the saturation curve passing through the intersection P of the dry-bulb temperature and the relative humidity.

Then, when the after-evaporation temperature TE is lower than the wet-bulb temperature Twet as a result of comparison between these temperatures, a request (hereinafter referred to the requirement for starting) is made to the EECU 150 at S160 to start engine 110.

Next, at S170, the compressor operation time is measured. Then, at S180, whether the operation time has exceeded a second predetermined time (hereinafter the required operation time Ts) is determined. When the required operation time is exceeded, a request is made to the EECU 150 at S190 to stop the engine 110, subsequently resetting the compressor operation time at S200, and returning to S100. On the other hand, when the after-evaporation temperature TE is higher than the wet-bulb temperature Twet, the process proceeds to S120.

Next, advantages (operation effect) of this embodiment will be described.

While the after-evaporation temperature TE is below the wet-bulb temperature Twet, the engine 110 stops to stop the compressor 231. The compressor 231 remains at a stop until the compressor stop time reaches the elapsed time To. Thereafter, the on-off operation is intermittently carried out to operate the compressor 231 for the required operation time Ts (hereinafter the intermittent operation mode). On the other hand, when the after-evaporation temperature TE is higher than the wet-bulb temperature Twet, the intermittent operation mode is stopped. Therefore, the rate of evaporation is reduced by the short-time flow of the refrigerant through the evaporator 230 (the rate at which the surface of the evaporator 230 dries).

The thick solid line in FIG. 6A indicates the behavior of the after-evaporation temperature TE in the air-conditioning system according to this embodiment. The thick broken line in FIG. 6A indicates the behavior of the after-evaporation temperature TE in other than the intermittent operation mode. Numerals 400, 410, 420 and 430 indicate measuring points of the after-evaporation temperature TE (refer to evaporator 440 in FIG. 6E). A thick solid line in FIG. 6B indicates the behavior of evaporation from the surface of evaporator 230 in the air-conditioning system according to this embodiment, while a thick broken line in FIG. 6B indicates the behavior of the evaporation rate from the evaporator 230 in other than the intermittent operation mode.

As is clear from the graphs of FIGS. 6A and 6B, since the rate of evaporation from the evaporator 230 is lowered, much of offensive smells from the surface of the evaporator 230 can be restrained from entering the vehicle interior. Also, as shown in FIG. 6C, the intensity of offensive smell can be restrained to lower than the permissible level. FIG. 6D gives a combination of graphs of 400, 410, 420 and 430 in FIG. 6C.

When the after-evaporation temperature TE is higher than the wet-bulb temperature Twet, all the offensive smells are gone as shown in FIG. 6C. Therefore, if the intermittent operation mode is stopped when the after-evaporation temperature TE is higher than the wet-bulb temperature Twet like in this embodiment, the fuel consumption can be further reduced by decreasing the rate of operation of the compressor 231.

In addition, at step s110 in FIG. 4, whether the defogging mode is necessary can be determined. In this case, when the defogging mode is necessary, temperature of the evaporator is forced lower to a predetermined low temperature (ex. 3–4 degrees C.) at step s120. When the defogging mode is determined unnecessary, after TEO is set higher than the wet bulb temperature, the process moves to s125.

As such, whether defogging is necessary, for example, may be determined by whether the DEF mode switch is turned on or the detected humidity is more than a predetermined value.

SECOND EMBODIMENT

In the above-described embodiment, the predetermined elapsed time To was fixed. In this embodiment, however, the predetermined elapsed time To is changed according to the introduced air temperature to prolong the predetermined elapsed time To according to the temperature rise of the air introduced into the air-conditioner casing 210. When the air temperature rises while the relative humidity of the introduced air remains nearly constant, regardless of the air temperature, the absolute humidity of the introduced air rises because of the nearly constant relative humidity.

The higher the introduced air temperature, the lower the rate of evaporation from the evaporator 230. Therefore, increasing the predetermined elapsed time To according to the temperature rise of the introduced air can lower the rate of operation of the compressor 231, thereby further decreasing the fuel consumption.

THIRD EMBODIMENT

In the first embodiment, the predetermined elapsed time To was constant. In this embodiment, however, the predetermined elapsed time To increases according to an increase in the humidity of the introduced air.

FOURTH EMBODIMENT

In the first embodiment, the predetermined elapsed time To was constant. In this embodiment, however, the predetermined elapsed time To increases with a decrease in the volume flow of air (electric voltage applied to the fan 220) flowing through in the air-conditioner casing 210.

FIFTH EMBODIMENT

In the first embodiment, the predetermined elapsed time To was constant. In this embodiment, however, the predetermined elapsed time To is set longer in the inside air circulation mode in which the inside air is drawn into the air-conditioner casing 210 than in the outside air introduction mode in which the outside air is drawn into the air-conditioner casing 220.

This is because that generally the relative humidity and absolute humidity of the introduced air become higher in the inside-air circulation mode than in the outside-air introduction mode, and therefore the rate of lowering of the evaporation rate from the evaporator 230 decreases more in the inside-air circulation mode than in the outside-air introduction mode.

SIXTH EMBODIMENT

In the first embodiment, the predetermined elapsed time To was constant. In this embodiment, however, the predetermined elapsed time To, in the outside-air introduction mode, is decreased with an increase in the vehicle speed. This is because that, in the outside-air introduction mode, the ram pressure increases with an increase in the vehicle speed and also the substantial volume of air flowing into the air-conditioner casing 210, thereby decreasing the predetermined elapsed time To according to an increase in the vehicle speed to restrain an increase in the rate of lowering of the surface wetting ratio of the evaporator 230.

SEVENTH EMBODIMENT

In the first embodiment, the predetermined elapsed time To was constant. In this embodiment, however, there is provided a solar radiation quantity sensor (solar radiation detecting means) which detects the quantity of solar radiation entering the vehicle interior in the inside air circulation mode, to thereby prolong the predetermined elapsed time To with a decrease in the quantity of solar radiation. This is because the inside temperature lowers and the relative humidity in the vehicle interior increases with decreasing solar radiation, resulting in decreased evaporation from evaporator 230.

EIGHTH EMBODIMENT

In the first embodiment, the intermittent operation mode is stopped when the after-evaporation temperature TE is higher than the wet-bulb temperature Twet. However, the after-evaporation temperature TE sometimes will not rise above the wet-bulb temperature Twet depending on the operating condition of the air-conditioning system. In this embodiment, therefore, if the after-evaporation temperature is under the wet-bulb temperature Twet, the intermittent operation mode will stop when the specific number of times the compressor 231 operates is reached (preferably 10 times in this embodiment) after the start of the intermittent operation mode. Here, one continuous period of operation (the required operation time Ts in this example) is counted as one time of operation of the compressor 231.

NINTH EMBODIMENT

In the above-described embodiment, the intermittent mode is carried out, without depending on the operating condition of the engine (driving source) 110. In the hybrid vehicle, however, if the vehicle is running (during operation of the air-conditioning system), it is possible that the engine 110 will stop. In this embodiment, therefore, when the engine stops, the intermittent operation mode is stopped.

TENTH EMBODIMENT

Figure 7:
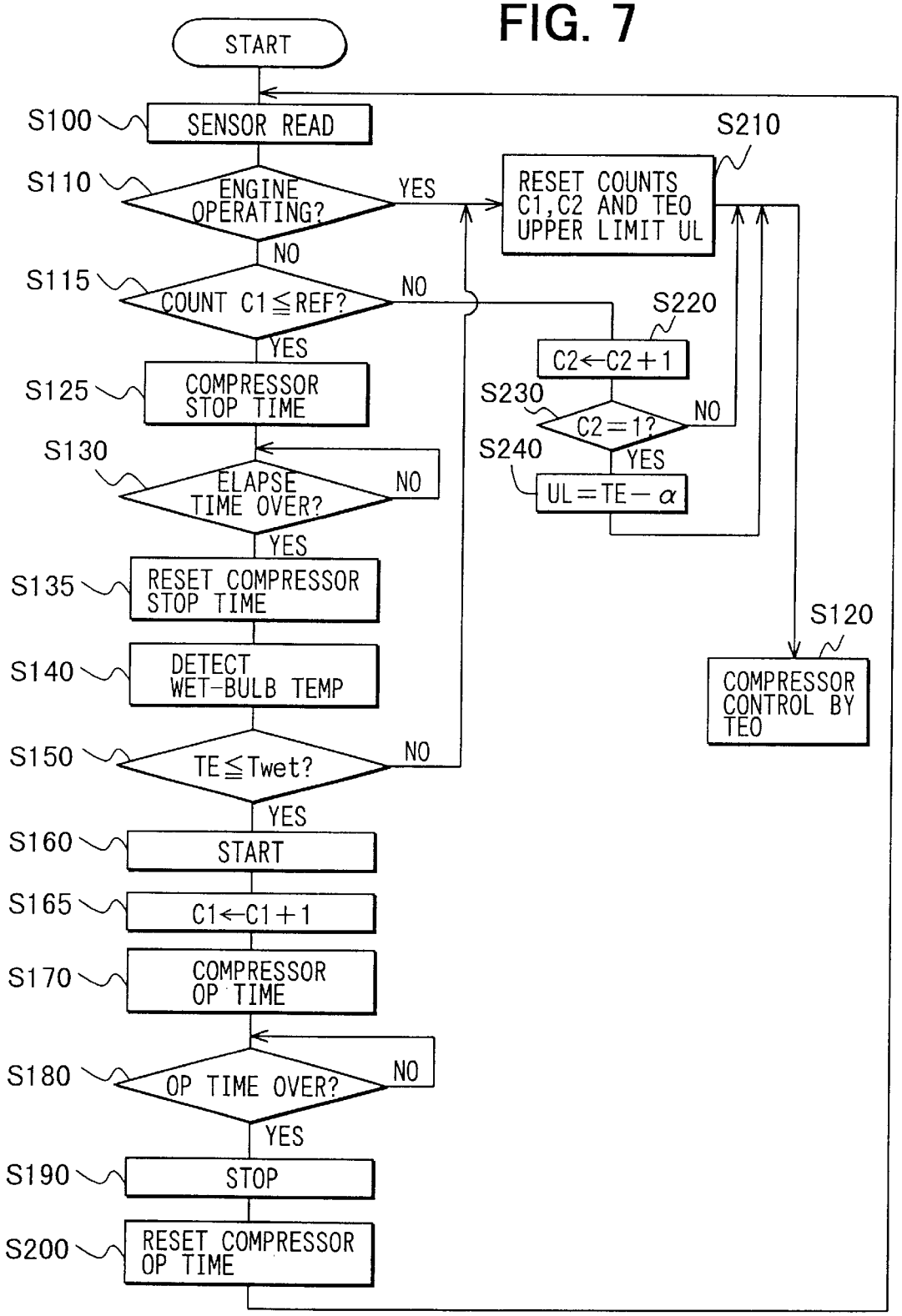
FIG. 7 is a flow chart of another embodiment of the present invention.

If the state where the after-evaporation temperature stays below the wet bulb temperature, the present invention may cycle indefinitely, thereby creating noise and causing discomfort to the driver. Therefore, in the tenth embodiment, as shown referring to FIG. 7, the process counts the specific number of times the compressor cycles as shown in s165. In step s115, the process compares the count c1 with a reference. If the count exceeds the reference, the process moves to s220 where c2=c2 and 1. At s230, the process determines if c2=1. If so, s240 sets the current temperature as the target temperature. Thereafter, the compressor is controlled to achieve this target temp.

ELEVENTH EMBODIMENT

Figure 8:
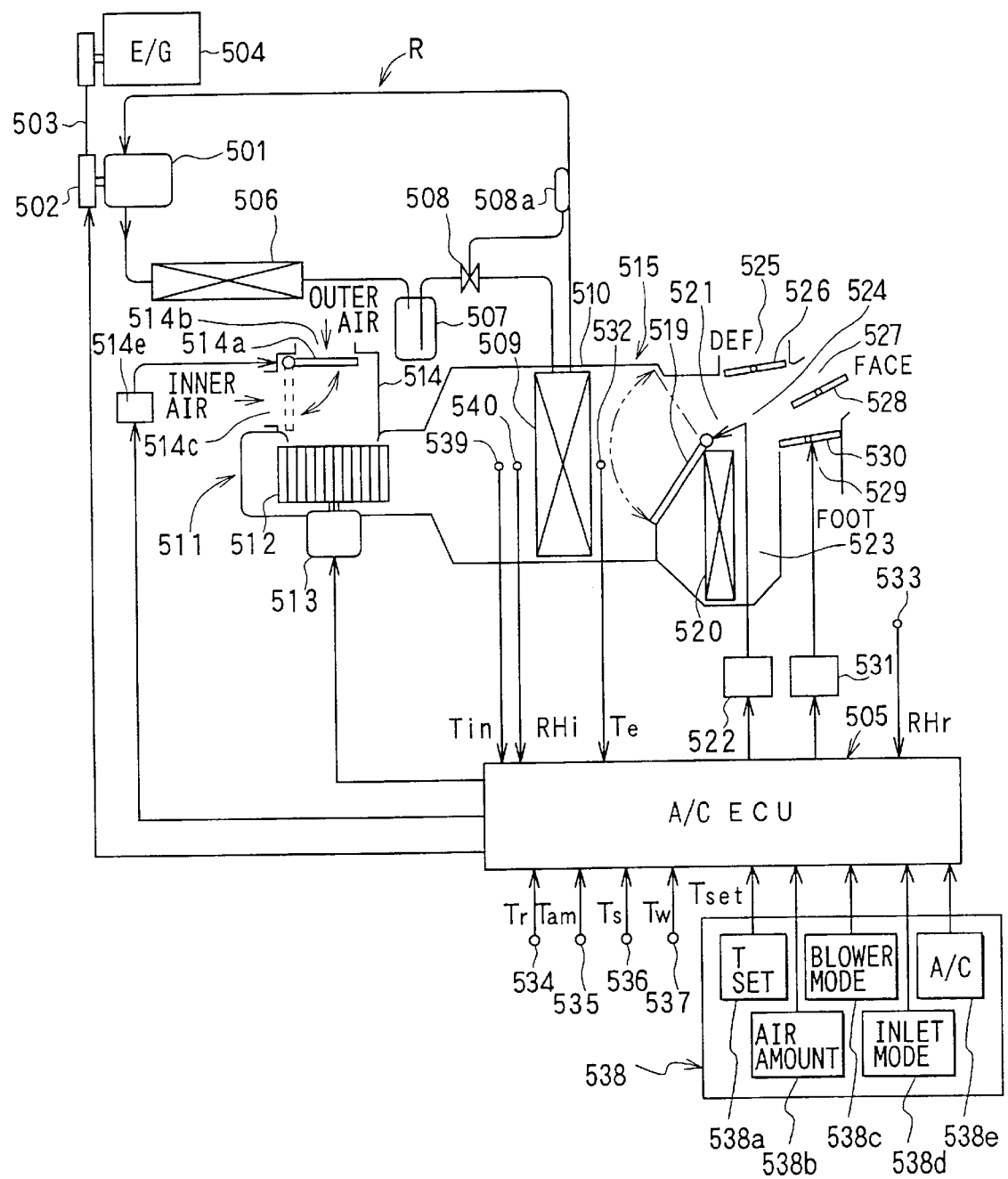
FIG. 8 is a schematic view showing a whole system (eleventh embodiment)

FIG. 8 is a diagram showing an overall configuration of the eleventh embodiment implementing a vehicle air-conditioning apparatus including a compressor 501 in a refrigeration cycle R for sucking, compressing and discharging refrigerant. The compressor 501 has an electromagnetic clutch 502 for turning an electric power supplied thereto on and off. A mechanical power of a vehicle engine 504 is transmitted to the compressor 501 through the electromagnetic clutch 502 and a belt 503. An electric power supplied to the clutch is turned on and off by an air-conditioning electronic control unit (ECU) 505. By turning on and off the electric power supplied to the electromagnetic clutch 502, the compressor 501 is intermittently operated.

Heated gas refrigerant discharged from the compressor 501 at a high temperature and a high pressure flows into a condenser 506. The gas refrigerant heat-exchanges with air blown by a cooling fan (not illustrated), and is cooled and condensed. The refrigerant condensed by the condenser 506 flows to a liquid receiver 507. Inside the liquid receiver 507, a gas component of the refrigerant is separated. Excess refrigerant (or liquid refrigerant) in the refrigeration cycle R is accumulated in the receiver 507.

The liquid refrigerant from the liquid receiver 507 has its pressure reduced by an expansion valve (a pressure-reducing means) 508, being put into a vapor-liquid 2-phase state with a low pressure. The expansion valve 508 is a temperature expansion valve having a temperature sensor 508a for sensing the temperature of refrigerant at the outlet of an evaporator (cooling heat exchanger) 509. The low-pressure refrigerant from the expansion valve 508 flows to the evaporator 509. The evaporator 509 is installed inside an air-conditioning case 510 of an air-conditioning unit 515 used in the vehicle air-conditioning apparatus. The low-pressure refrigerant in the evaporator 509 absorbs heat from air in the case 510 while evaporating. The outlet of the evaporator 509 is joined to the sucking side of the compressor 501. As described above, the compressor 501, the condenser 506, the liquid receiver 507, the expansion valve 508 and the evaporator 509 are components of the refrigeration cycle R, which form a closed circuit.

The case 510 includes a blower 511 provided at the upstream side of the evaporator 509. The blower 511 has a centrifugal fan 512 and a driving motor 513. At the sucking side of the fan 512, an air inlet door assembly 514 is provided. An air inlet door 514a of the assembly 514 opens and closes an outer-air-introducing opening 514b and an inner-air-introducing opening 514c. Thus, outer air (air outside the vehicle) or inner air (air inside the vehicle) is introduced in accordance with the position of the inlet door 514a. The inlet door 514a is driven by an electrical driving unit 514e such as a servo motor.

Air blown by the blower 511 flows into the upstream portion of the evaporator 509 in the case 510. In the case 510, an air-mix door 519 is provided at the downstream side of the evaporator 509. At the downstream side of the air-mix door 519, there is provided a hot-water-type heater core (a heating heat exchanger) 520 for heating air by using heated water (engine coolant) of the vehicle engine 504 as a heat source. At the side (the upper portion) of the hot-water-type heater core 520, there is formed a bypass passage 521 for flowing air bypassing the hot-water-type heater core 520.

The air-mix door 519 is a rotatable plane door driven by an electrical driving unit 522 such as a servomotor. The air-mix door 519 adjusts a ratio of the air volume of heated air passing through the hot-water-type heater core 520 to the air volume of cool air passing through the bypass passage 521. By adjusting the amount ratio of the heated air and cool air, the temperature of air blown to the inside of the vehicle is controlled. Thus, in the present embodiment, the air mix-door 519 serves as a temperature-adjusting means for adjusting the temperature of air blown to the inside of the vehicle.

At the downstream side of the hot-water-type heater core 520, a warm-air passage 523 is formed, being extended from the lower side to the upper portion. The warm air from the warm-air passage 523 is mixed with the cool air from the bypass passage 521 in an air-mixing unit 524 to produce air having a desired temperature.

In addition, in the case 510, a blowing-out-mode-switching unit is provided at the downstream side of the unit 524. Specifically, a defroster opening 525 for blowing air to the inner surface of the front glass of the vehicle is provided on the upper surface portion of the case 510. The defroster opening 525 is closed and opened by a plane defroster door 526, which is capable of rotating.

Also at the upper surface portion of the case 510, a face opening 527 for blowing air toward the upper halves of the bodies of the passengers in the vehicle is formed in a portion at the vehicle-rear side with respect to the defroster opening 525. The face opening 527 is closed and opened by a plane face door 528, which is capable of rotating.

In addition, in the case 510, a foot opening 529 for blowing air toward the feet of the passengers in the vehicle is formed at a lower-side portion of the face opening 527. The foot opening 529 is closed and opened by a plane face door 530, which is capable of rotating.

The blowing-out-mode doors 526, 528 and 530 are linked to a common link mechanism (not illustrated). The blowing-mode doors 526, 528 and 530 are opened and closed by an electrical driving unit 531 such as a servomotor, through the link mechanism.

Next, an overview of an electrical control unit used in the present embodiment will be explained. The air-conditioning electronic control unit 505 comprises the commonly known microcomputer and electric circuits around it. The microcomputer includes components such as a CPU, a ROM and a RAM. The air-conditioning electronic control unit 505 also includes a temperature sensor 532, which is a thermistor for sensing the temperature of the evaporator 509. Thus, in the air-conditioning case 510, the temperature sensor 532 is placed at a portion right after an air flow blown out of the evaporator 509. Thus, the temperature sensor 532 senses an evaporator outlet air temperature Te.

In addition, in the present embodiment, inside the vehicle, there are also provided a humidity sensor 533 for detecting a relative humidity RHr inside the vehicle, a temperature sensor 539 for detecting an inlet air temperature Tin of the evaporator 509 and a humidity sensor 540 for sensing a relative humidity RHi of the inlet air of the evaporator 509.

The air-conditioning electronic control unit 505 inputs signals generated by not only the sensors 532, 533, 539 and 540 but also from miscellaneous sensors 534 through 537 which output signals representing respectively an room temperature Tr, an outer-air temperature Tam, a solar radiation value Ts and a hot-water temperature Tw which are used for air-conditioning control.

In an air-conditioning control panel 538 installed at a location proximity close to a in-vehicle meter panel, there are provided operation switches 538a–538e which are operated manually by a passenger. Signals generated by the operation switches 538a–538e are also supplied to the air-conditioning electronic control unit 505.

A temperature-setting switch 538a generates a temperature-setting signal Tset. An air-amount switch 538b generates an air-amount-setting signal. A blow-out-mode switch 538c generates a blow-out mode signal. An air inlet mode selector switch 538d generates an air inlet mode selector signal. The operation switch 538e is an air-conditioning switch.

The blow-out-mode switch 538c is manually operated to set a mode such as a face, foot, bi-level, foot-defroster and defroster mode. The air-conditioning switch 538e generates an on/off signal output to the compressor 501.

Figure 9:
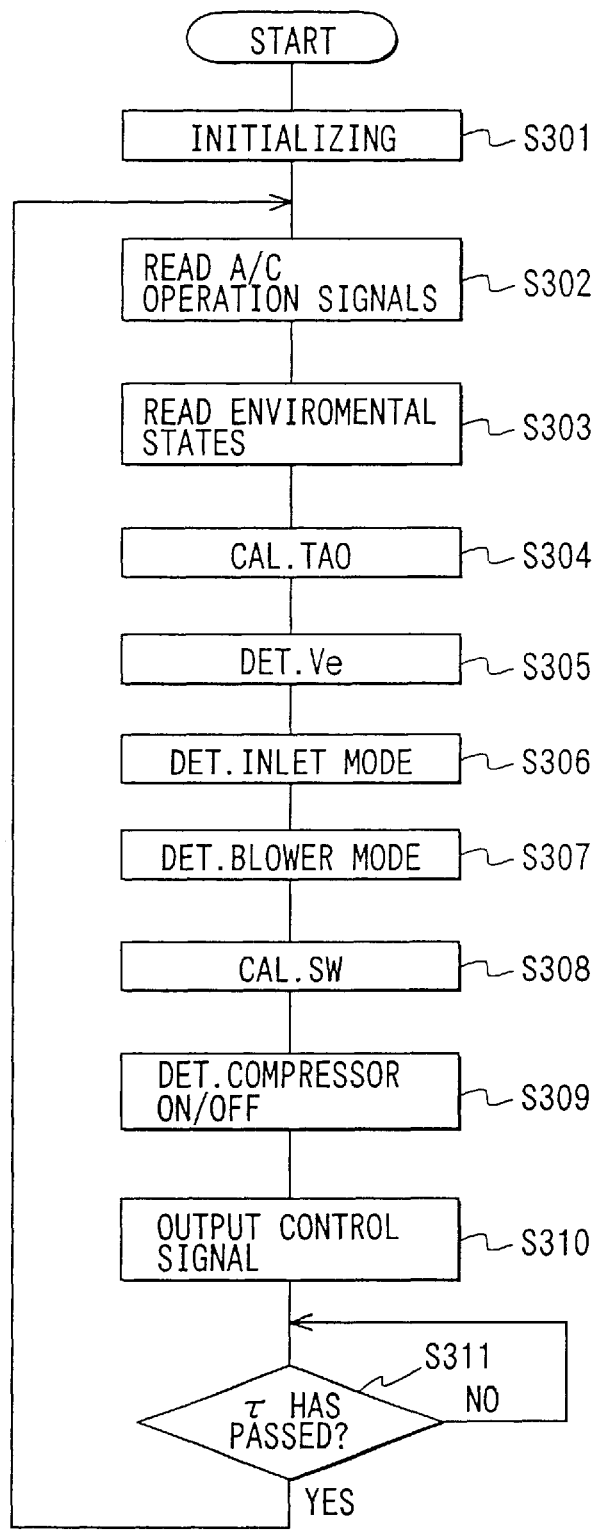
FIG. 9 is a flowchart representing an overview of entire air-conditioning control (eleventh embodiment)

Next, an operation of the present embodiment having a configuration described above will be explained. A flowchart shown in FIG. 9 represents an outline of control executed by the microcomputer used in the air-conditioning electronic control unit 505. The control routine represented by the flowchart shown in FIG. 9 is started when an ignition switch of the vehicle engine 504 is turned on.

The flowchart begins with a step S301 at which a flag, a timer and the like are initialized. Then, at the next step S302, operation signals generated by the operation switches 538a–538e of the air-conditioning control panel 538 and other signal generators are input. Subsequently, at the next step S303, detection signals generated by the sensors 532 and 537 and other signal sources to represent the environmental states of the vehicle are input.

Then, at the next step S304, a target outlet air temperature TAO of air-conditioning air blown to the inside of the vehicle is computed. The target outlet air temperature TAO is an outlet air temperature required for sustaining the temperature of the inside of the vehicle at a set temperature Tset set by the temperature-setting switch 538a. The target outlet air temperature TAO is computed in accordance with the following equation:

$$TAO = Kset \times Tset - Kr \times Tr - Kam \times Tam - Ks \times Ts + C \quad (1)$$

where Tr is an room temperature detected by the in-vehicle-temperature sensor 533, Tam denotes an outer air temperature detected by the outer temperature sensor 534, Ts denotes a solar radiation value detected by the solar sensor 535, Kset, Kr, Kam and Ks each denote a control gain and notation C denotes a constant used for correction.

Next, at the step S305, the target air volume of air blown by the blower 511 is determined based on the target outlet air temperature TAO. For example, the target air amount of air blown by the blower 511 is represented by a voltage Ve generated by the blower-driving motor 513 and applied to the blower 511. As a method to determine the blower voltage Ve representing the target air volume of air blown by the blower 511, for a target outlet air temperature TAO set at a high value for maximum heating and at a low value for maximum cooling, the blower voltage Ve is increased but, for a target outlet air temperature TAO set at a middle value, the blower voltage Ve is reduced as is generally known.

Then, at the next step S306, an inner air or outer air mode is determined. Specifically, when the temperature Tr of the inner air is much higher than the set temperature Tset by a predetermined temperature, that is, when the cooling load is largely high, an in-vehicle mode is set. Otherwise, an outer-air mode is set. As an alternative, when the target outlet air temperature TAO increases from a low value to a high one, for example, the mode is switched as follows: from a complete inner air mode, to an inner and outer air mixed mode and then to a complete outer air mode.

Subsequently, at the next step S307, the blow-out mode is determined in accordance with the target outlet air temperature TAO. As is generally known, when the target outlet air temperature TAO increases from low to high, the blow-out mode is switched from a face mode to a bi-level mode and then to a foot mode.

Then, at a step S308, a target opening SW of the air-mix door 519 is determined from the target outlet air temperature TAO, the temperature Te of air blown out from the evaporator 509 and the temperature Tw of hot water in accordance with Eq. (2) as follows:

$$SW=((TAO-Te)/(Tw-Te))\times 100[\%] \qquad (2)$$

A target opening SW of the air-mix door 519 having a value of 0% represents a maximum cooling position of the air-mix door 519 and a target opening SW of the air-mix door 519 having a value of 100% represents a maximum heating position of the air-mix door 519. The maximum cooling position and the maximum heating position of the air-mix door 519 are shown by a solid line and a one-dotted chain line respectively in FIG. 8.

Subsequently, at the next step S309, the operation of the compressor 501, that is, the on/off state of the compressor 501, is determined. For example, a voltage Vc applied to the electromagnetic clutch 502 is determined in accordance with a result of comparison of the target evaporator temperature TEO with the evaporator outlet air temperature Te detected by the temperature sensor 532. In this way, the operation to turn the compressor 501 on and off is determined. Details of the step S309 will be described later with reference to a flowchart shown in FIG. 10.

Then, at the next step S310, control signals are output to a variety of actuator units 502, 513, 514e, 522 and 531 so as to result in control states determined at the steps S305–S309. Subsequently, the flow of the control advances to a step S311 to determine whether a control period τ has passed. If the control period τ has passed, the flow of the control returns to the step S302.

Figure 10:
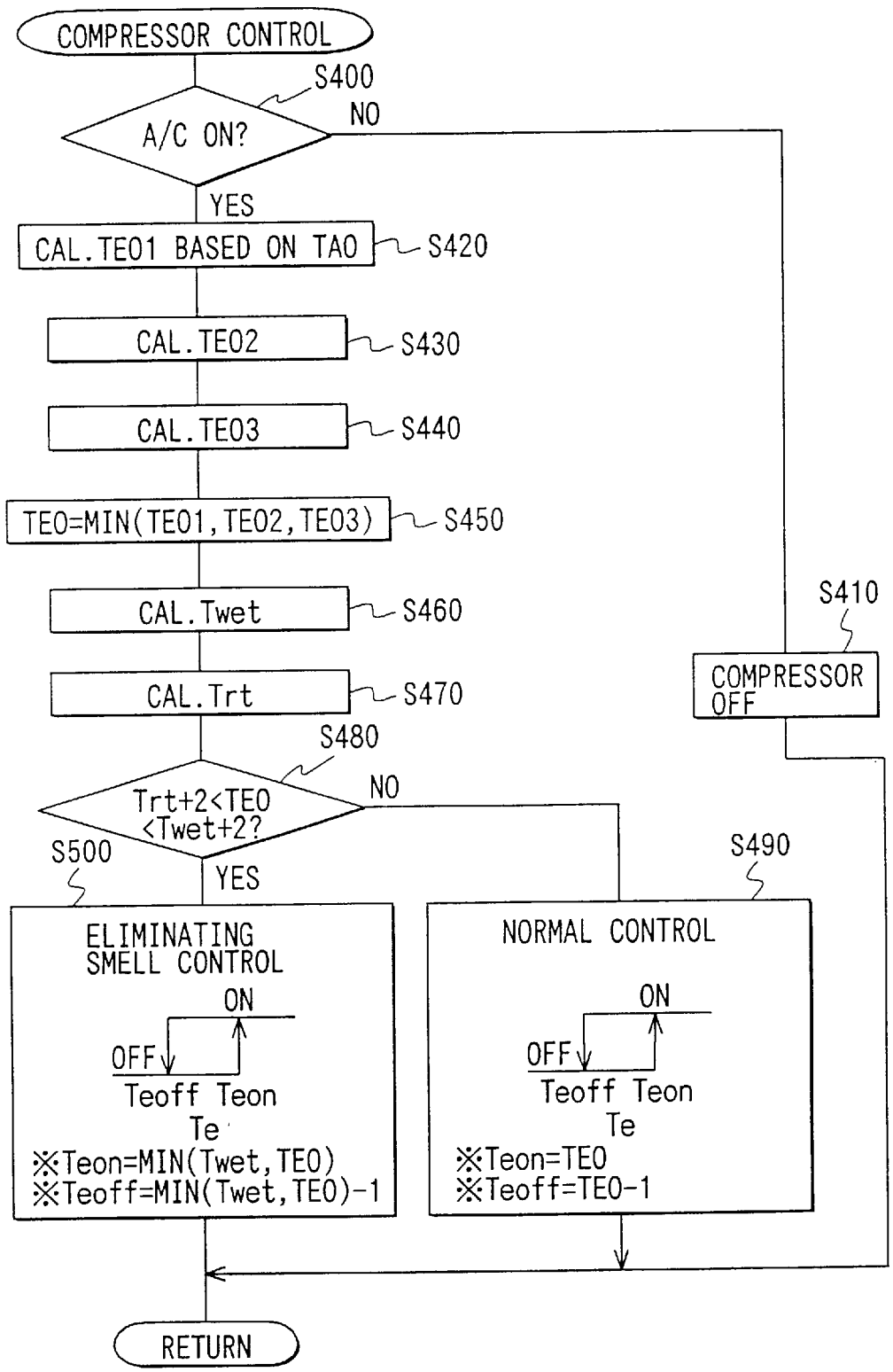
FIG. 10 is a flowchart representing compressor control (eleventh embodiment)

FIG. 10 is a flowchart representing typical control to turn on and off the compressor 501 at the step S309 of the flowchart in FIG. 9. As shown in FIG. 10, the flowchart begins with a step S400 to determine whether the air-conditioning switch 538e is on or off state. If the air-conditioning switch 538e is off state, the flow of the control advances to a step S410 at which off signal is output to the compressor 501.

Figure 11:
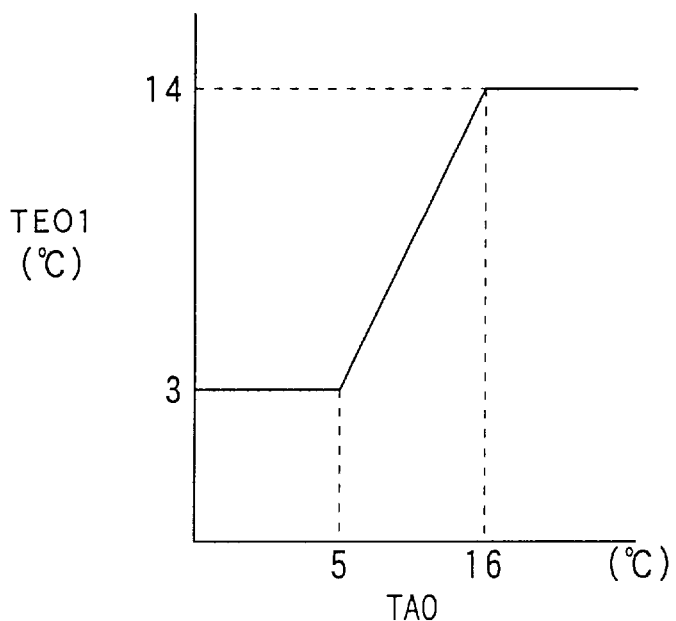
FIG. 11 is a graph showing a characteristic of a target evaporator temperature for controlling a room temperature (eleventh embodiment)

If the air-conditioning switch 538e is on state, on the other hand, the flow of the control advances to a step S420 at which an evaporator temperature TEO1 used in room-temperature control is calculated from the target outlet air temperature TAO computed at the step S304 of the flowchart in FIG. 9. The evaporator temperature TEO1 is determined in order to obtain an evaporator temperature required for controlling the temperature of the inside of the vehicle. Thus, TEO1 is determined at a value which becomes smaller with a decrease in target outlet air temperature TAO in accordance with the map shown in FIG. 11.

Figure 12:
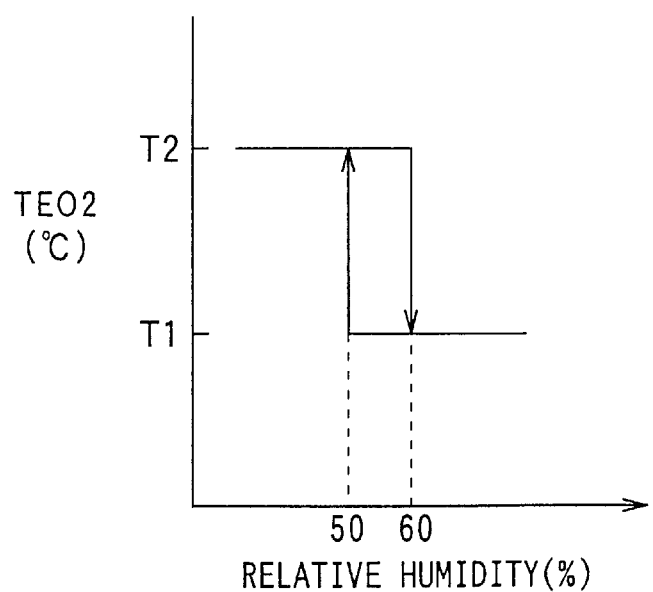
FIG. 12 is a graph showing a characteristic of a target evaporator temperature for controlling in-vehicle humidity (eleventh embodiment)

Then, at the next step S430, an evaporator temperature TEO2 used in controlling the inside of the vehicle to a comfortable humidity range is calculated. The evaporator temperature TEO2 is determined at a value that sustains the in-vehicle relative humidity RHr detected by the humidity sensor 533 at a value close to a target relative humidity of typically 60%. As shown in a map in FIG. 12, if the in-vehicle relative humidity exceeds 60%, the temperature TEO2 is set at a rather small value T1 of typically 11° C. If the in-vehicle relative humidity goes below 50%, on the other hand, the temperature TEO2 is set at a rather large value T2 of typically 18° C. In this way, by switching the temperature TEO2 between the two rather small and rather high values in accordance with the in-vehicle relative humidity, the in-vehicle relative humidity RHr is maintained at a value close to the target relative humidity of typically 60%.

Subsequently, at the next step S440, a target evaporator temperature TEO3 used in control to prevent a window glass of the vehicle from becoming dim is computed. The window glass becomes dim because of two main reasons, namely, a low temperature of the window glass and a high relative humidity of the air inside the vehicle. That is, the lower the temperature of the window glass and the higher the relative humidity of the air inside the vehicle, the more easily the window glass of the vehicle becomes dim.

Figure 13:
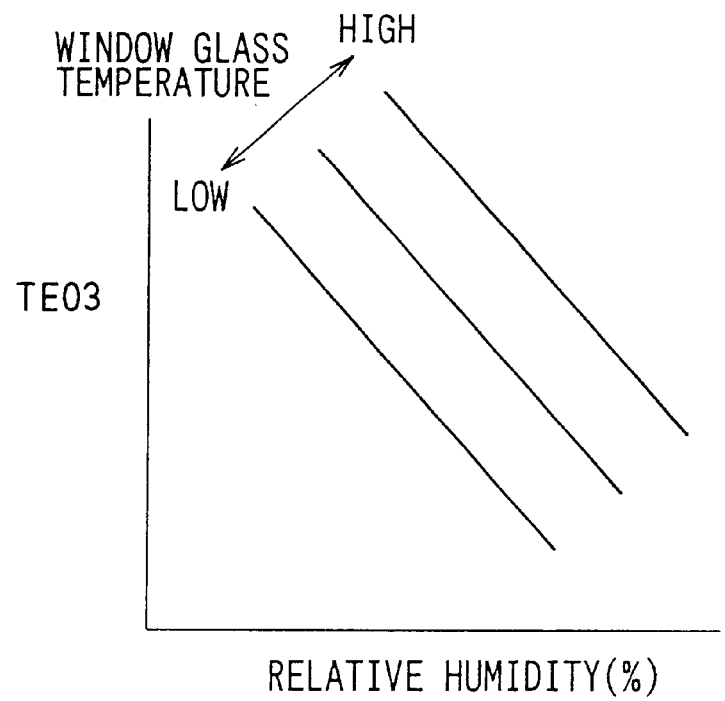
FIG. 13 is a graph showing a characteristic of a target evaporator temperature for preventing dimness of a window glass (eleventh embodiment)

For this reason, at the step S440, the target evaporator temperature TEO3 is determined at a value in accordance with a map shown in FIG. 13 indicating a relation that, the lower the temperature of the window glass and the higher the relative humidity of the air inside the vehicle, the lower the value at which the target evaporator temperature TEO3 is set. The target evaporator temperature TEO3 is set at a value based on the temperature of the window glass and the relative humidity of the air inside the vehicle so that the relative humidity of air in close proximity to the inner surfaces of the window glasses is maintained at a value close to 90%.

Here, the temperature of a window glass is directly detected by a temperature sensor or computed or inferred indirectly from amounts such as the temperature Tam of the ambient air, the speed of the vehicle, the defroster outlet air temperature and the temperature Tr of the in-vehicle air.

Then, at the next step S450, the target evaporator temperature TEO is finally set at the smallest value among the three target evaporator temperatures, namely, TEO1, TEO2 and TEO3. It should be noted that, in order to prevent hunting, a predetermined hysteresis width of normally about one degree is provided between a temperature to turn on the compressor 501 and a temperature to turn off the compressor 501. In the present embodiment, the target evaporator temperature TEO is used as the temperature to turn on the compressor 501.

At the next step S460, a wet-bulb temperature Twet of air sucked by the evaporator is computed. For example, the wet-bulb temperature Twet of air sucked by the evaporator can be computed from a psychometric shown in FIG. 33, a temperature Tin of the air sucked by the evaporator and a relative humidity RHi of the air sucked by the evaporator. The temperature Tin and the relative humidity RHi are detected by the temperature sensor 539 and the humidity sensor 540, respectively. The psychometric chart is stored in advance in the ROM used in the air-conditioning electronic control unit 505.

Then, at the next step S470, a dew-point temperature Trt of the air sucked by the evaporator 509 is computed from a temperature Tin of the air sucked by the evaporator and a relative humidity RHi of the air sucked by the evaporator.

The flow of the processing then advances to a step S480 to form a determination as to whether or not the target evaporator temperature TEO is in a range where a smell is generated from the evaporator 509. Fir example, the target evaporator temperature TEO is examined to determine whether the target evaporator temperature TEO has a value close to the wet-bulb temperature Twet and the dew-point temperature Trt.

At the step S480, the target evaporator temperature TEO is examined to determine whether the target evaporator temperature TEO is lower than (the wet-bulb temperature Twet+2° C.) and higher than (the dew-point temperature Trt+2° C.) The criterion range (the dew-point temperature Trt+2° C.) to (the wet-bulb temperature Twet+2° C.) is set by considering factors such as a response delay of the temperature sensor 532 and variations in detected temperature. It is desirable, however, to set this criterion range at values proper for the product in question by considering factors such as characteristics of the temperature sensor 32 and characteristics of the refrigeration cycle R with respect to control to turn the compressor 501 on and off. These characteristics of the refrigeration cycle R are response characteristics of changes in evaporator outlet air temperature.

If the target evaporator temperature TEO is within the criterion range, suspension and resumption of the operation of the compressor 501 cause condensation water to be generated repeatedly on the surface of the evaporator 509, making the surface wet, and the condensation water to evaporate, making the surface dry repeatedly. This phenomenon is determined as a smell generated by the evaporator 509.

If the result of determination obtained at the step S480 is NO indicating that the target evaporator temperature TEO is in a range where a smell is not generated from the evaporator 509, the flow of the processing advances to a step S490 at which normal control of the compressor 501 is executed. In the normal control of the compressor 501, if the actual evaporator outlet air temperature Te detected by the temperature sensor 532 exceeds the target evaporator temperature TEO, an ON signal of the compressor 501 is output. If the actual evaporator outlet air temperature Te detected by the temperature sensor 532 goes down to the target evaporator temperature TEO−1° C., on the other hand, an OFF signal of the compressor 501 is output. That is, during the normal control of the compressor 501, an evaporator outlet air temperature Teon to turn on the compressor 501 is the target evaporator temperature TEO and an evaporator outlet air temperature Teoff to turn off the compressor 501 is the target evaporator temperature TEO−1° C.

During the normal control of the compressor 501 executed at the step S470, there is no restriction imposed on the upper limit of the target evaporator temperature TEO for eliminating the smell. Thus, the target evaporator temperature TEO can be raised to a minimum value required from the standpoints of the in-vehicle humidity control and the window-glass-dimness prevention control. In particular, during a season with the open air put in a low-humidity environment as is the case with the middle of a spring or an autumn, the minimum temperature can be raised to a value around 20° C. In this state, the availability factor of the compressor 501 decreases, enhancing the effect of saving an energy consumed by the vehicle engine 504.

As is generally known, a person in the air-conditioned internal space of the vehicle feels comfortable in a relatively wide range of temperatures even without cooling (or cooling and dehumidification) by the evaporator 509, that is, even without having the compressor 501 running, when the relative humidity is in a comfortable range which is a wide range of about 25% RH to 65% RH.

Thus, in order to detect the relative humidity RHr of the air inside the vehicle, the present embodiment is provided with an additional humidity sensor 533 used as an air-conditioning sensor. Then, by setting the target evaporator temperature TEO at such a value that the relative humidity RHr of the air inside the vehicle is maintained at a value close to the upper limit of the comfortable range, for example, a value around 60% RH, the availability factor of the compressor 501 can be further decreased so as to allow energy saving of the vehicle engine 504 to be effectively implemented.

If the result of determination obtained at the step S480 is YES indicating that the target evaporator temperature TEO is in a range where a smell is generated from the evaporator 509, on the other hand, the flow of the processing advances to a step S500 at which compressor control is executed to suppress the smell. Thus, the evaporator outlet air temperature Teon to turn on the compressor 501 is suppressed to a value below the wet-bulb temperature Twet of the evaporator inlet air. That is, the evaporator outlet air temperature Teon to turn off the compressor 501 is set at the lower value of the target evaporator temperature TEO and the wet-bulb temperature Twet, or Teon=MIN (Twet, TEO).

On the other hand, the evaporator outlet air temperature Teoff to turn off the compressor 501 is set at a value lower than the evaporator-outlet air temperature Teon to turn off the compressor 501 by a predetermined hysteresis width of typically 1° C. That is, $$Te\text{off}=\text{MIN}(Twet, TEO)-1° \text{ C.}$$

Figure 14:
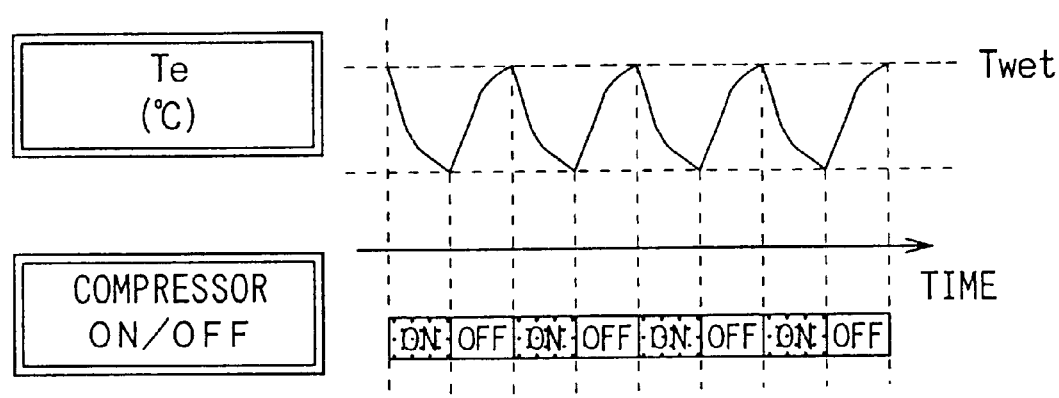
FIG. 14 is an explanatory diagram showing the operation of compressor control (eleventh embodiment)

FIG. 14 is a diagram showing compressor control executed at the step S500 to suppress a smell. As shown in the figure, when the evaporator outlet air temperature Te increases, reaching the wet-bulb temperature Twet, the compressor 501 is turned on all the time. Thus, during a period (2) shown in FIG. 32B, wherein the evaporator outlet air temperature Te is equal to the wet-bulb temperature Twet, the evaporator outlet air temperature Te is again decreased. As a result, the period (2) transits to a period (3) with condensation water on the surface of the evaporator 509 prevented from evaporating. That is, generation of a smell is effectively prevented.

In addition, also during the compressor control to suppress a smell, the evaporator outlet air temperature Teon to turn on the compressor 501 is increased to the wet-bulb temperature Twet of the evaporator inlet air. Thus, in comparison with a case in which the evaporator outlet air temperature Teon to turn on the compressor 501 is set at a low value not exceeding the dew-point temperature Trt of the air sucked by the evaporator 509, the off cycle of the compressor 501 becomes longer, causing the availability factor to decrease. As a result, the effect of energy saving of the vehicle engine 504 is increased.

TWELFTH EMBODIMENT

Figure 15:
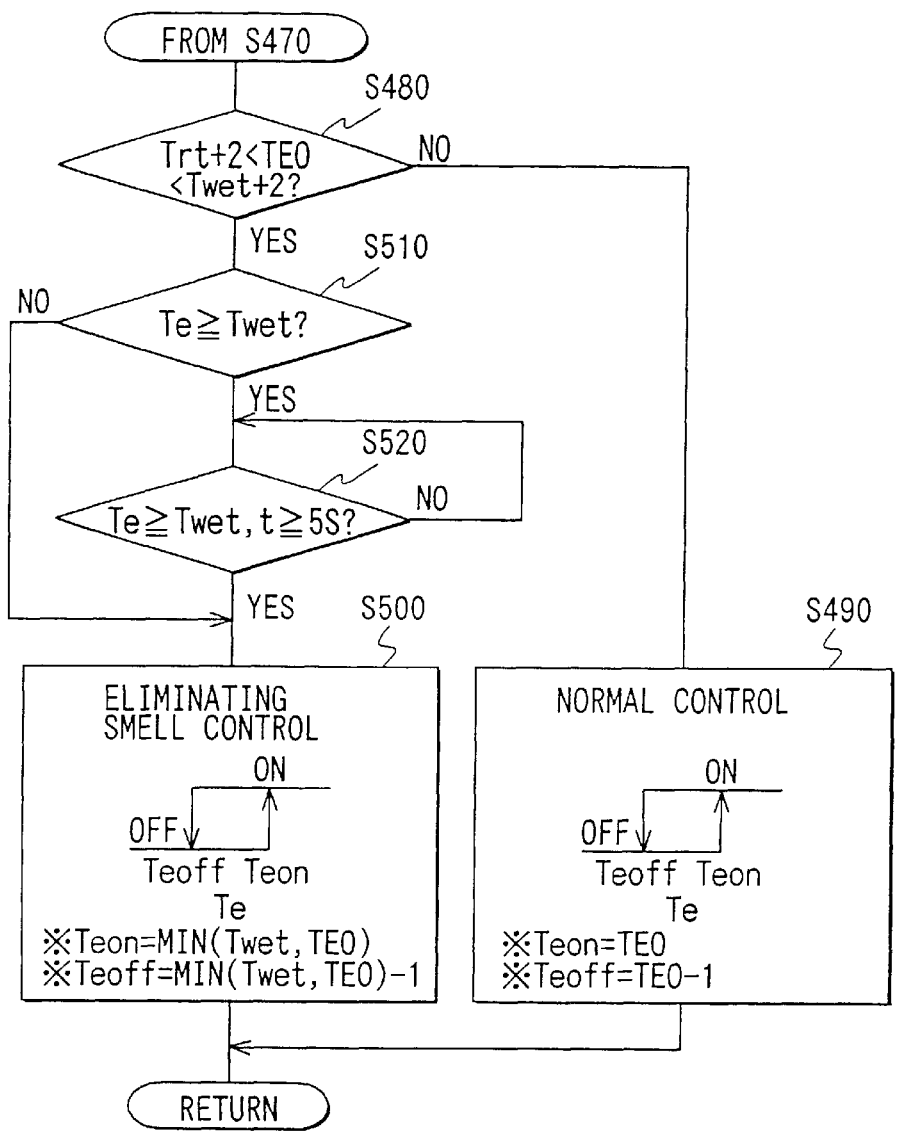
FIG. 15 is a flowchart representing compressor control (twelfth embodiment)

FIG. 15 is a flowchart representing control executed in accordance with a twelfth embodiment. The control includes the same pieces of processing carried out at the steps S400–S470 of the flowchart shown in FIG. 10 but not shown in FIG. 15. In the case of the twelfth embodiment, steps S510 and S520 are added between the steps S480 and S500 of the flowchart shown in FIG. 10.

Figure 32A:
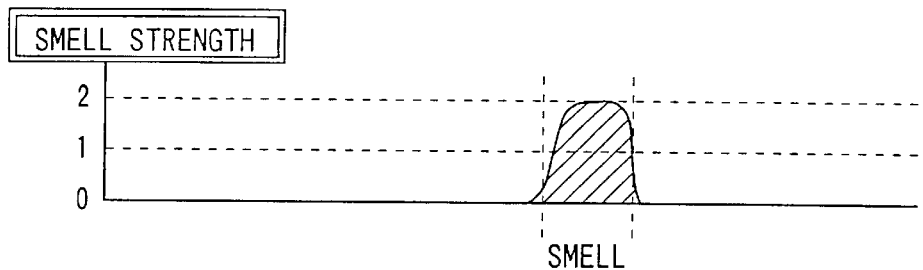
FIGS. 32A–32D are explanatory diagrams showing relations between control to turn a compressor on and off, variations in evaporator outlet air temperature and a mechanism generating a smell in the related art.
Figure 32B:
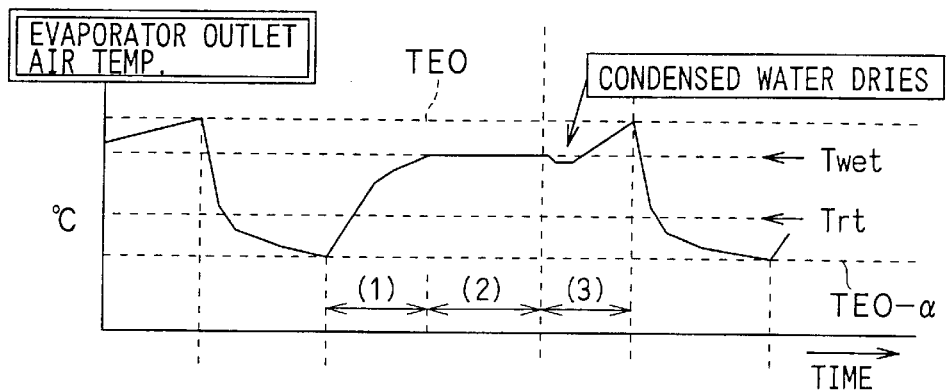
Figure 32C:
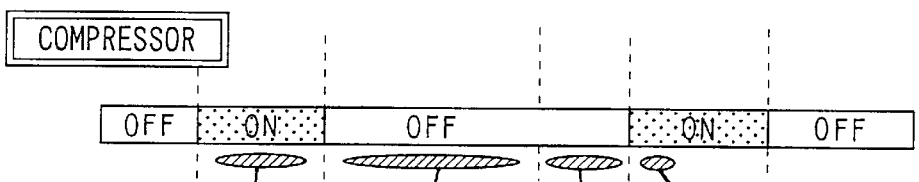
Figure 32D:
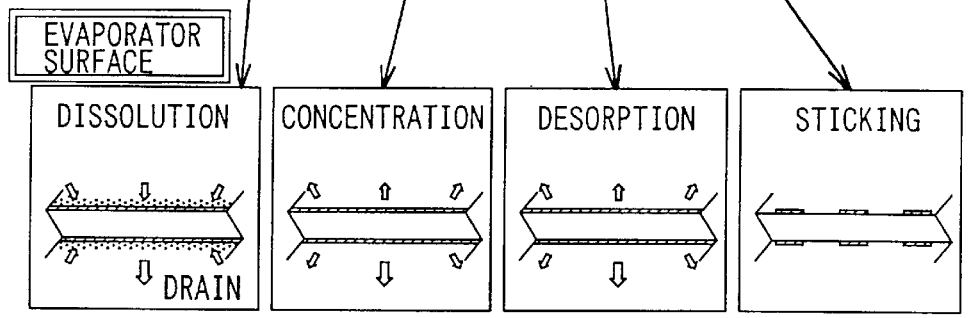

In detail, the off period of the compressor 501, that is, the period (2) shown in FIG. 32B, wherein the temperature Te of air blown out from the evaporator 509 is equal to the wet-bulb temperature Twet is sustained for some time prolonged to a certain degree. The twelfth embodiment takes advantage of the fact that no smell is generated during the period (2). That is, the steps S510 and S520 are added so that the flow of the control goes on to the step S500 after a predetermined period t0 of typically five seconds has lapsed since the temperature Te of air blown out from the evaporator 509 becomes equal to the wet-bulb temperature Twet. At the step S500, the compressor 501 is turned on to prevent a smell from being generated.

Figure 16:
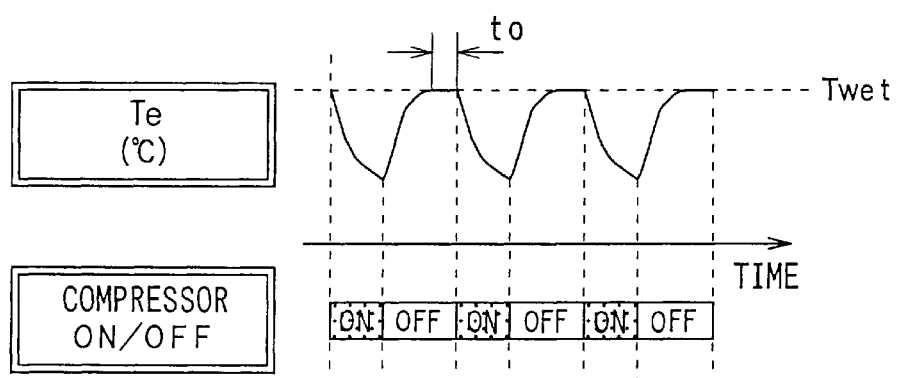
FIG. 16 is an explanatory diagram showing the operation of compressor control (twelfth embodiment)

According to the twelfth embodiment, an operation to turn on and off the compressor 501 is carried out as shown in FIG. 16. In comparison with the eleventh embodiment shown in FIG. 14, the off period of the compressor 501 is lengthened by the predetermined period t0. As a result, the availability factor of the compressor 501 is further decreased so as to allow effect of energy saving of the vehicle engine 504 to be further improved.

As described above, in the twelfth embodiment, the predetermined period t0 is set uniformly at a fixed value of five seconds. Here, after the temperature Te of air blown out from the evaporator 509 becomes equal to the wet-bulb temperature Twet during the off period of the compressor 501, the time it takes condensation water on the surface of the evaporator 509 to evaporate, that is, the period (2) shown in FIG. 32, varies in accordance with the amount of the condensation water on the surface of the evaporator 509 and the evaporating speed of the condensation water. In addition, the amount of the condensation water on the surface of the evaporator 509 and the evaporating speed of the condensation water is inferred from quantities including the evaporator inlet air temperature, relative humidity and dew-point temperature and the temperature of air blown out from the evaporator 509. Thus, the period t0 has a variable length that is computed from the amounts including the evaporator inlet air temperature, relative humidity and dew-point temperature and the temperature of air blown out from the evaporator 509.

THIRTEENTH EMBODIMENT

Figure 17:
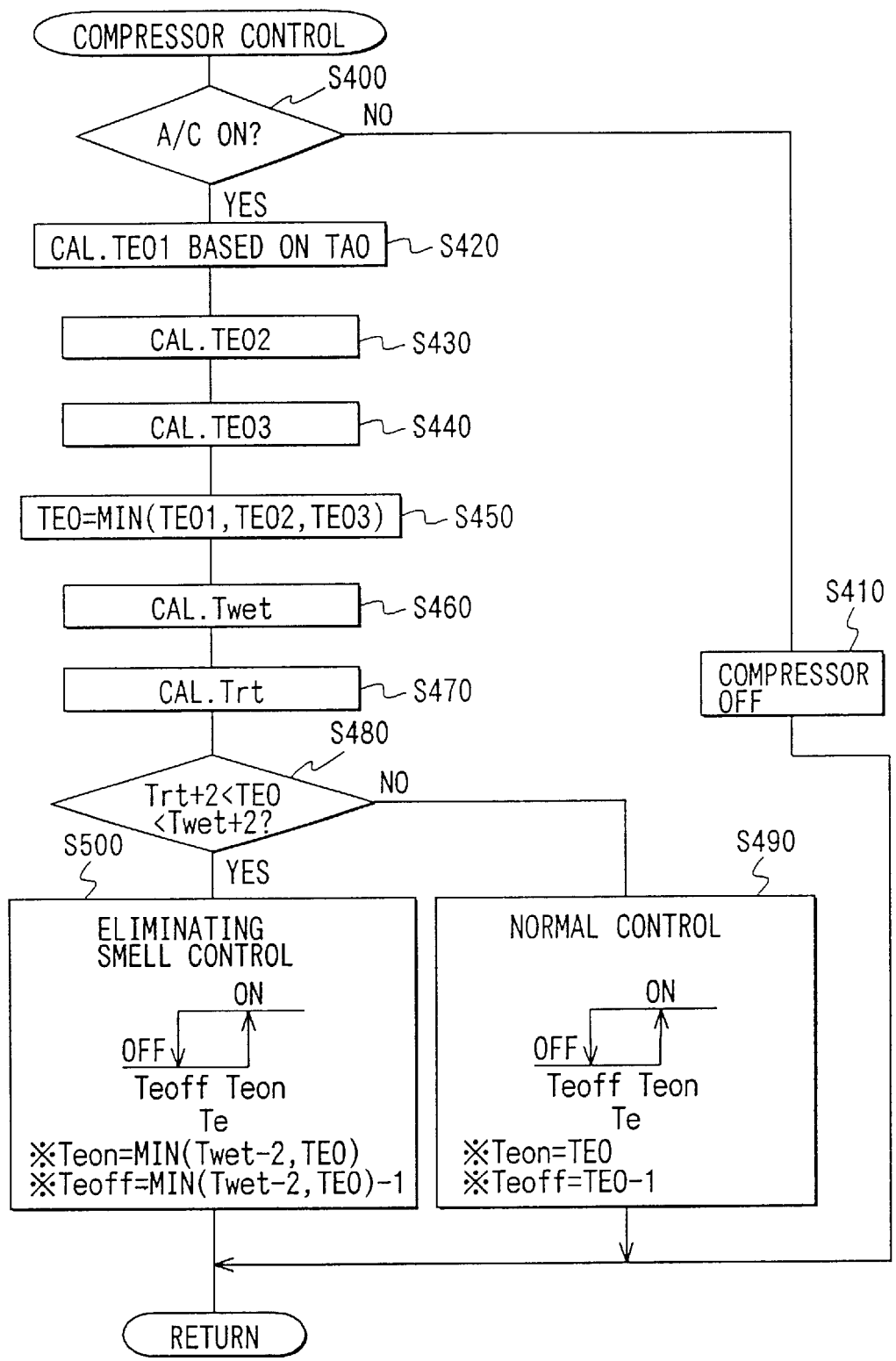
FIG. 17 is a flowchart representing compressor control (thirteenth embodiment)

FIG. 17 is a flowchart representing control executed according to a thirteenth embodiment. In the case of the eleventh embodiment, the evaporator-outlet air temperature Teon to turn on the compressor 501 is set at MIN (Twet, TEO) at the step S500. In the case of the thirteenth embodiment, on the other hand, the evaporator-outlet air temperature Teon to turn on the compressor 501 is set at MIN (Twet−2, TEO) at the step S500a.

Figure 18:
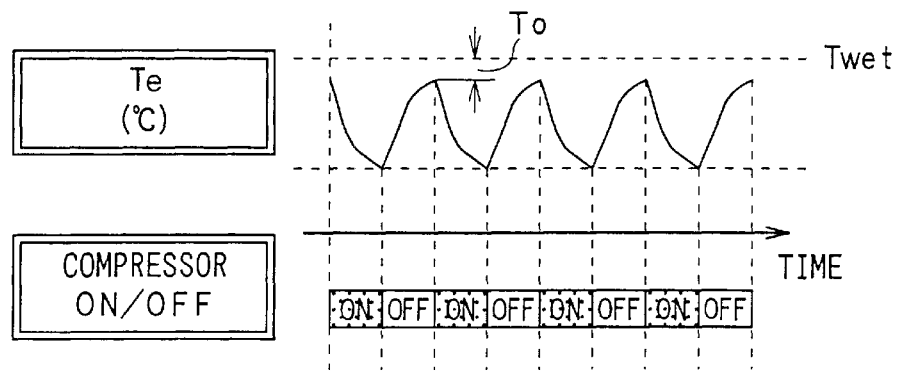
FIG. 18 is an explanatory diagram showing the operation of compressor control (thirteenth embodiment)

That is, the compressor 501 is turned on at a temperature lower than the wet-bulb temperature Twet by a predetermined temperature of T0 as shown in FIG. 18. In the thirteenth embodiment, the difference T0 is set at 2° C.

It is necessary to detect the evaporator inlet air temperature Tin and humidity RHi which are used for computing the wet-bulb temperature Twet of the air sucked by the evaporator 509. A computation error may result due to, among other causes, a response delay of the temperature sensor 539 for detecting the temperature Tin, a response delay of the humidity sensor 540 for detecting the humidity RHi and variations in detection signal. For this reason, in the. case of the thirteenth embodiment, the compressor 501 is turned on at a temperature lower than the wet-bulb temperature Twet by the predetermined temperature T0 of 2° C. in order to display the effect of smell suppression with high certainty.

FOURTEENTH EMBODIMENT

Figure 19:
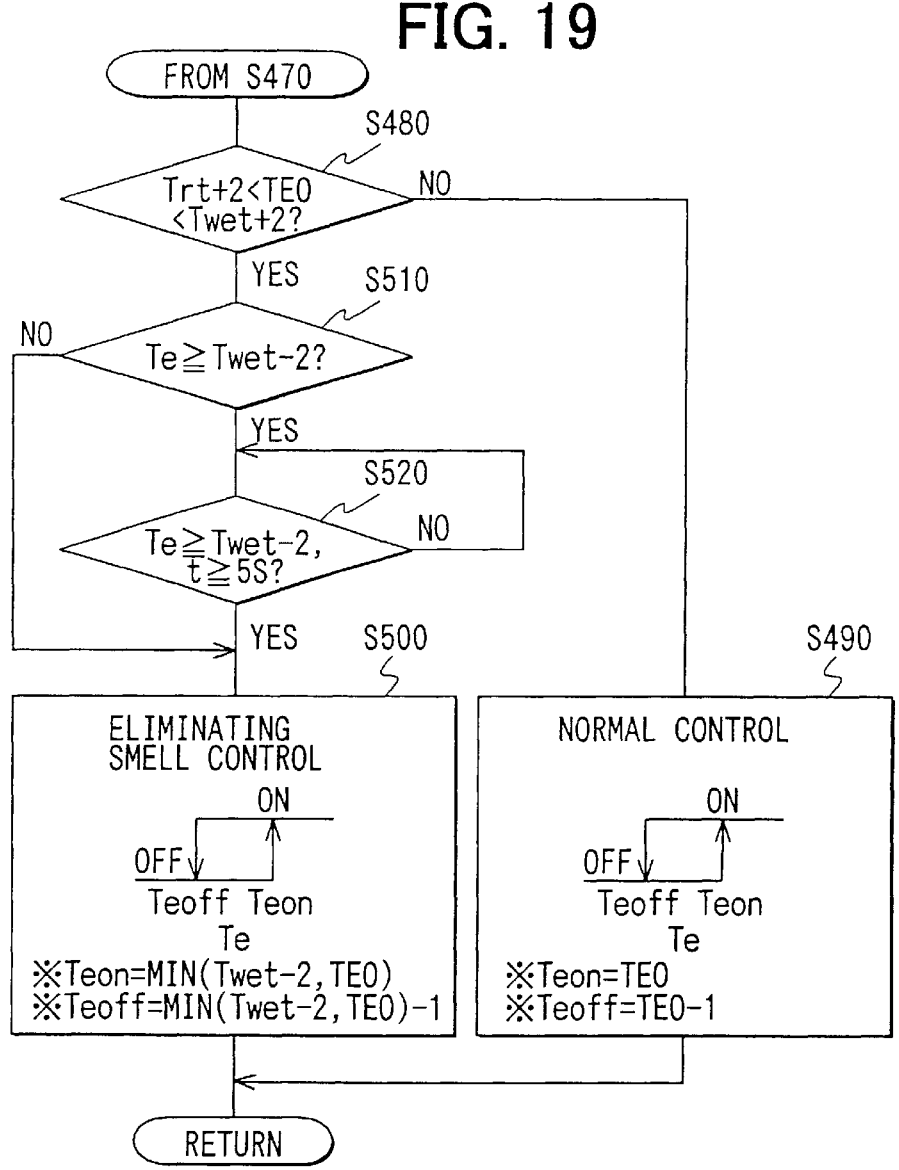
FIG. 19 is a flowchart representing compressor control according (fourteenth embodiment)

FIG. 19 is a flowchart representing control executed according to a fourteenth embodiment, which is a combination of the twelfth and thirteenth embodiments. Specifically, in the case of the fourteenth embodiment, the evaporator outlet air temperature Teon to turn on the compressor 501 in the twelfth embodiment is changed to (Twet−2° C.) as in the thirteenth embodiment.

Figure 20:
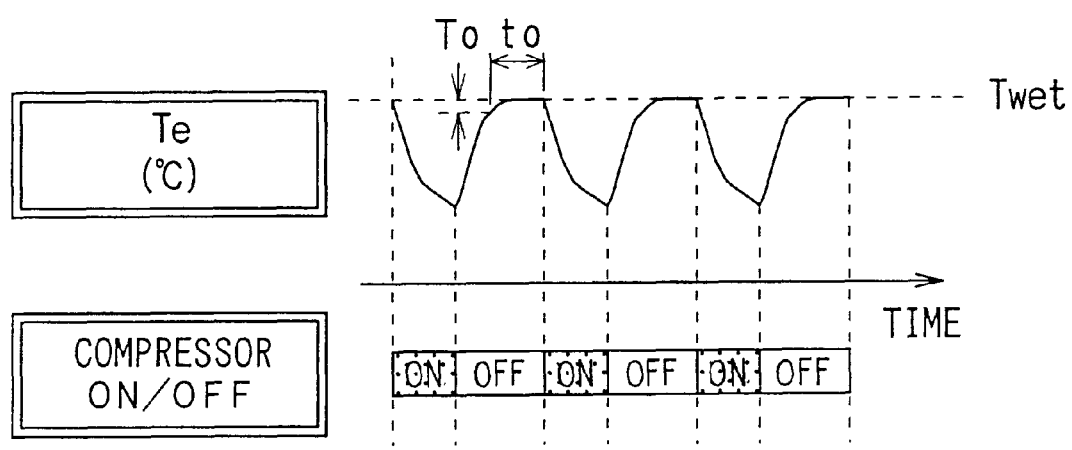
FIG. 20 is an explanatory diagram showing the operation of compressor control (fourteenth embodiment)

Thus, according to the fourteenth embodiment, the flow of the control advances to the step S500 after a predetermined period t0 of typically five seconds has lapsed since the temperature Te of air blown out from the evaporator 509 becomes equal to (Twet−T0) as shown in FIG. 20. At the step S500, the compressor 501 is turned on to prevent a smell from being generated. As a result, while the effect of preventing the smell generation is being displayed, the off period of the compressor 501 is lengthened by the predetermined period T0 so that the availability factor of the compressor 501 is reduced to allow the power-saving effect of the vehicle engine 504 to be improved.

FIFTEENTH EMBODIMENT

In the case of the eleventh through fourteenth embodiments, the upper limit of the temperature Te of air blown out from the evaporator 509 is basically controlled to a value close to the wet-bulb temperature Twet of air sucked by the evaporator 509. Thus, a smell is prevented from being generated from the evaporator 509 as a result of control to turn on and off the compressor 501. In the case of the fifteenth embodiment, attention is given to the hysteresis width of the control to turn on and off the compressor 501. That is, if the fifteenth embodiment detects a condition in which a smell may be generated from the evaporator 509, the hysteresis width is reduced to suppress generation of the smell from the evaporator 509.

The fifteenth embodiment determines target evaporator temperatures for the control to turn on and off the compressor 501, namely, the evaporator outlet temperature Teon to turn on the compressor 501 and the evaporator outlet temperature Teoff to turn off the compressor 501, by adoption of a concept different from that embraced by the eleventh through fourteenth embodiments.

Figure 21:
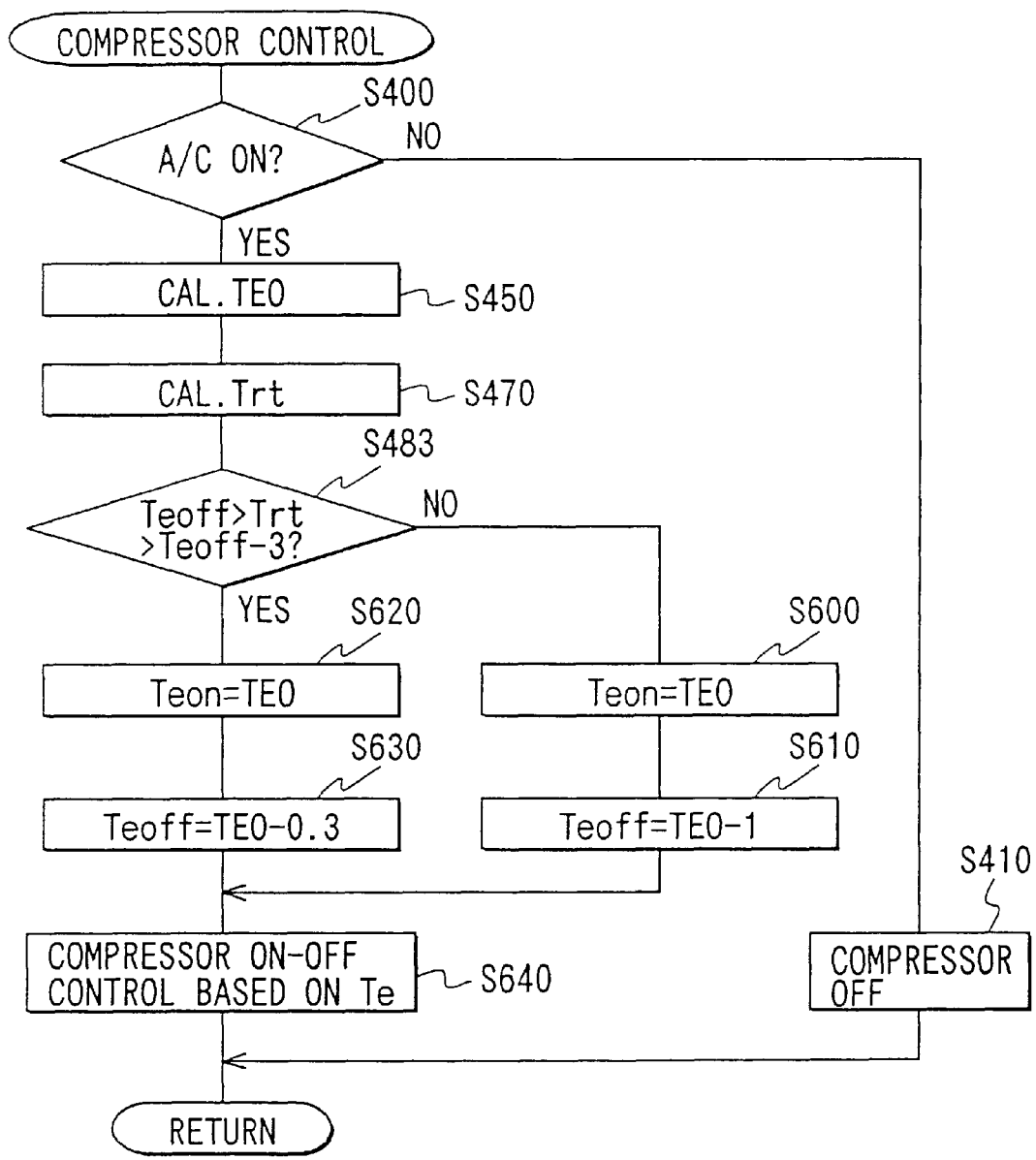
FIG. 21 is a flowchart representing compressor control (fifteenth embodiment)

FIG. 21 is a flowchart representing control executed in the fifteenth embodiment. Pieces of processing carried out at steps S400 and S410 are the same as their respective counterparts in the eleventh through fourteenth embodiments. At a step S450, the target evaporator temperature TEO is computed from the target outlet air temperature TAO shown in the step S304 of the flowchart shown in FIG. 9. From the room-temperature-control point of view, the target evaporator temperature TEO of the present embodiment is determined so as to get the relation (TAO−C)>TEO.

The reason for that is described as follows. When the compressor 501 is turned on and off, the temperature Te of air blown out from the evaporator 509 varies. By setting the target evaporator temperature TEO at a value lower than the target outlet air temperature TAO of air blown out from the evaporator 509 by a predetermined temperature, variations in temperature of air blown to the inside of the vehicle can be eliminated by adjusting the opening of the air mix door 519 or adjusting the amount of heat generated by the heat core 520.

Figure 33:
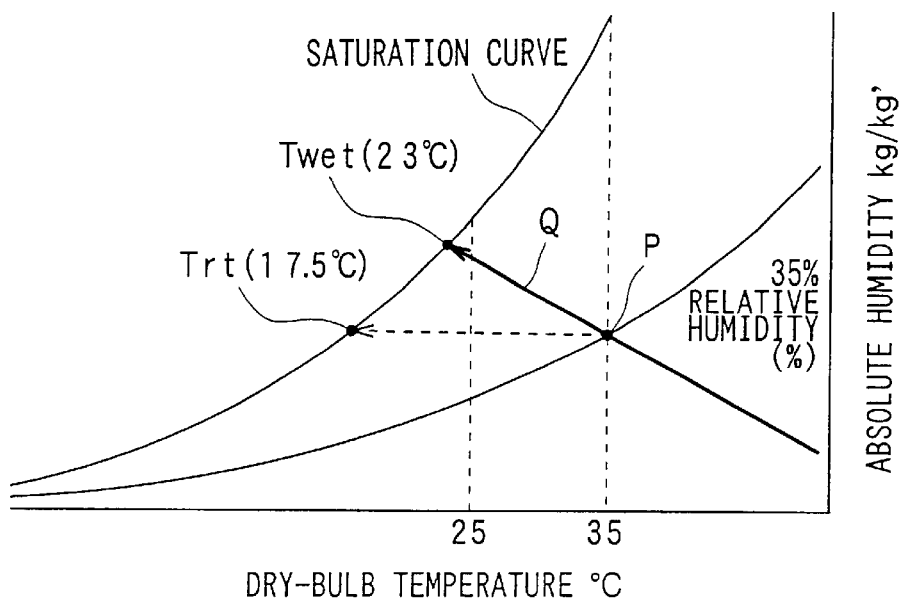
FIG. 33 is a psychometric diagram used for explaining the related art and the present invention.

The processing carried out at the next step S470 is the same as the respective counterpart in the eleventh through fourteenth embodiments. In this processing, the dew-point temperature Trt is computed from a psychometric chart and a temperature Tin of air sucked by the evaporator 509, which are shown in FIG. 33, as well as a relative humidity RHi. Then, the flow of the control goes on to step S483 to determine whether a condition in which a smell may be generated from the evaporator 509 is satisfied in the same way as the determination at the step S480 of the flowchart shown in FIG. 10 and the like. For example, in the present embodiment, the processing is carried out as follows.

The dew-point temperature Trt is examined to determine whether the temperature is in the range Teoff to (Teoff−3° C.) where notation Teoff denotes the temperature to turn off the compressor 501. The temperature Teoff to turn off the compressor 501 is equal to (TEO−1° C.) where notation TEO denotes the target evaporator temperature. A dew-point temperature Trt in the range leads to a result of determination that a condition in which a smell may be generated from the evaporator 509 is satisfied, that is, a wet state (Te<Trt) of the surface of the evaporator 509 and a dry state (Te>Twet) of the surface of the evaporator 509 prevail repeatedly, accompanying the on-off operations of the compressor 501.

If the result of determination obtained at the step S483 is NO or a condition in which a smell may be generated from the evaporator 509 is not satisfied, the normal control of the compressor 501 is executed. In detail, at a step S600, the evaporator outlet air temperature Teon to turn on the compressor 501 is set at TEO. Then, at the next step S610, the evaporator outlet air temperature Teoff to turn off the compressor 501 is set at (TEO−1° C.).

If the result of determination obtained at the step S483 is YES or a condition in which a smell may be generated from the evaporator 509 is not satisfied, on the other hand, the hysteresis width of the control to turn the compressor 501 on and off is reduced to suppress generation of the smell. In detail, at a step S620, the evaporator outlet air temperature Teon to turn on the compressor 501 is set at TEO. Then, at the next step S630, the evaporator outlet air temperature Teoff to turn off the compressor 501 is set at (TEO−0.3° C.). Since the evaporator outlet air temperature Teoff to turn off the compressor 501 is raised, the hysteresis width (Teon−Teoff) of the control to turn the compressor 501 on and off is reduced from 1° C. for the normal control of the compressor 501 to 0.3° C.

At the next step S640, the evaporator outlet air temperature Te actually detected by the temperature sensor 532 is compared with the evaporator outlet air temperature Teon to turn on the compressor 501 and the evaporator outlet air temperature Teoff to turn off the compressor 501 to determine whether to turn the compressor 501 on or off.

Figure 22:
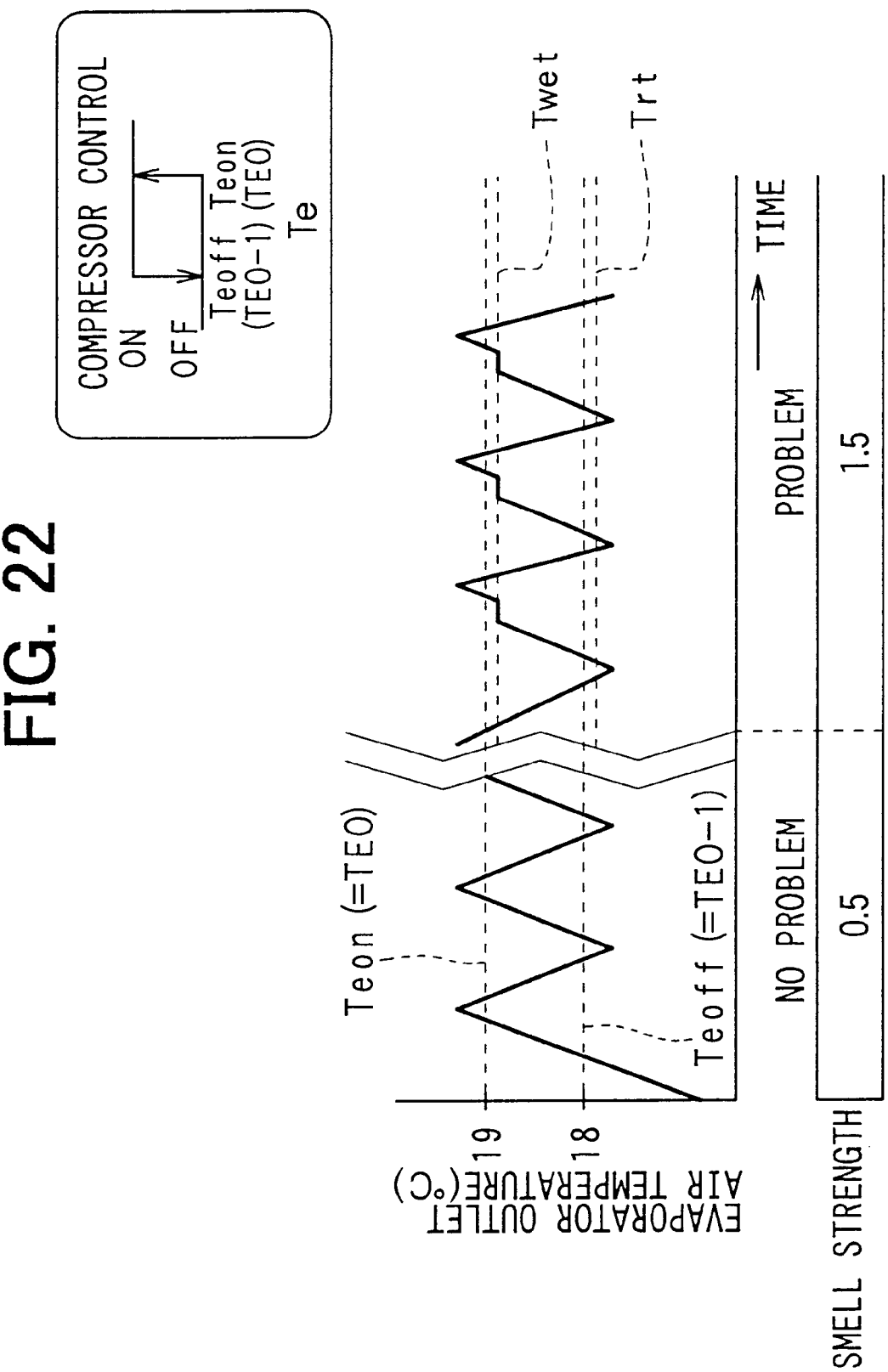
FIG. 22 is an explanatory diagram showing the operation of compressor control according to a related art corresponding to the fifteenth embodiment.

Next, advantages of the fifteenth embodiment are explained relative to the prior art. FIG. 22 is a diagram showing the compressor control based on the prior art, wherein the hysteresis width (Teon−Teoff) is always kept at 1° C. FIG. 22 also shows a case in which the target evaporator temperature TEO (or the evaporator outlet air temperature Teon to turn on the compressor 501) is increased to 19° C.

For example, environmental conditions in which air conditioning is carried out are an open-air temperature of 35° C. and an open-air humidity of 50%. Thus, with an open-air mode set as the inlet mode of the air-conditioning apparatus, the temperature Tin of air sucked by the evaporator 509 is 35° C. and the humidity of the air sucked by the evaporator 509 is 50%. From the psychometric chart shown in FIG. 33, the inlet-air-dew-point temperature Trt and wet-bulb temperature Twet are found to be 23° C. and 26° C. respectively. Therefore, even if the target evaporator temperature TEO is set at 19° C., TEO is still sufficiently lower than the dew-point temperature Trt. Accordingly, the surface of the evaporator 509 can be kept in a wet state all the time. As a result, as shown on the left side of FIG. 22, the strength of a smell felt by passengers in the vehicle is at a level causing no problem.

In environmental conditions including an evaporator inlet air temperature Tin of 21.5° C. and an evaporator inlet air humidity of 80%, however, from the psychometric chart shown in FIG. 33, the inlet-air-dew-point temperature Trt and wet-bulb temperature Twet are found to be 18° C. and 19° C. respectively. In this case, as shown on the right side of FIG. 22, the inlet-air-dew-point temperature Trt and wet-bulb temperature Twet are both close to the target evaporator temperature TEO.

Also in this case, at a target evaporator temperature TEO (Teon) of 19° C., the compressor 501 is turned on and, at (TEO−1) or Teoff of 18° C., on the other hand, the compressor 501 is turned off. Due to causes such as a response delay of the temperature sensor 532 and a response characteristic of the refrigeration cycle R, however, an undershoot of the evaporator outlet air temperature Te occurs when the compressor 501 is turned off. As a result, the temperature Te of air blown out from the evaporator 509 becomes lower than the dew-point temperature Trt, causing condensation water to stick on the surface of the evaporator 509. On the other hand, an overshoot of the evaporator outlet air temperature Te occurs when the compressor 501 is turned on. As a result, the temperature Te of air blown out from the evaporator 509 exceeds the wet-bulb temperature Twet, causing condensation water to completely evaporate from the surface of the evaporator 509 in a phenomenon known as complete drying.

For this reason, the mechanism shown in FIG. 32 causes a smell to be generated with a smell strength increasing to a level of 1.5 smell-strength units. Thus, if the control to turn the compressor 501 on and off is executed at a constant hysteresis width according to the related art, it is practically impossible to switch the target evaporator temperature TEO to a high temperature of 19° C. due to the problem of the smell generation. It is thus impossible to increase the effect of power saving.

In the case of the fifteenth embodiment, on the other hand, when the inlet-air-dew-point temperature Trt and wet-bulb temperature Twet have values both close to the target evaporator temperature TEO such as 18° C. and 19° C. respectively, the result of determination obtained at the step S483 of the flowchart shown in FIG. 21 indicates validity of a condition in which a smell may be generated from the evaporator 509. In this case, at the step S630, the temperature Teoff to turn off the compressor 501 is raised to (TEO−0.3° C.) to reduce the hysteresis width to 0.3° C.

Figure 23:
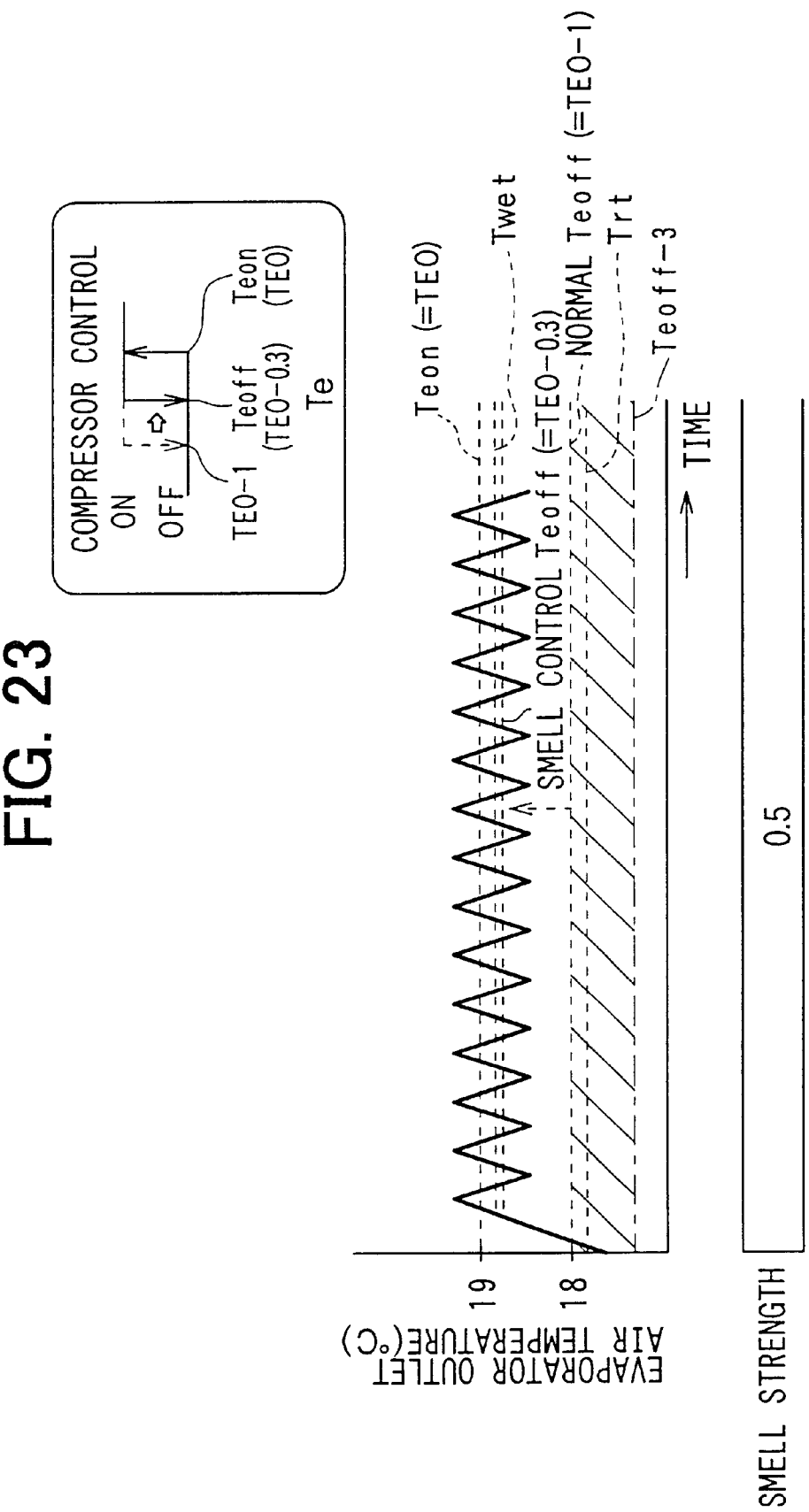
FIG. 23 is an explanatory diagram showing the operation of compressor control (fifteenth embodiment)

As a result, as shown in FIG. 23, with the temperature Te of air blown out from the evaporator 509 reaching a level sufficiently higher than the dew-point temperature Trt, the compressor 501 is turned off. Thus, the temperature Te of air blown out from the evaporator 509 will not decrease to the dew-point temperature Trt even if an undershoot of the temperature Te of evaporator outlet air occurs. Therefore, no condensation water is generated on the surface of the evaporator 509. Accordingly, since the surface of the evaporator 509 is kept in a dry state, the smell strength can be kept at a level of 0.5 smell-strength units which cause no problem.

As a result, generation of smell can be suppressed and, at the same time, the effect of power saving by switching the target evaporator temperature TEO to a high value can be attained.

Here, as is understood from the comparison of FIG. 22 with FIG. 23, the compressor control according to the fifteenth embodiment can be the control to reduce the period of control to turn the compressor 501 on and off to a value smaller than the normal control of the compressor 501 when detecting a condition in which a smell may be generated from the evaporator 509.

In addition, only under the condition in which a smell may be generated from the evaporator 509, is the period of the control to turn the compressor 501 on and off reduced. Since the period of the normal control condition is increased as usual, the adverse effect on the long life of the electromagnetic clutch 502 can be reduced.

In addition, in the evaporator 509, a temperature distribution unavoidably results to a certain degree due to causes such as non-uniform vapor-liquid distribution of refrigerant along the refrigerant path and non-uniform wind velocity distribution of air. Since the temperature sensor 532 detects only the temperature Te of a representative air blown out from the evaporator 509, in the control according to the fifteenth embodiment as shown in FIG. 23, the temperature Te of some air blown out from the evaporator 509 may be lower than the dew-point temperature Trt at some locations due to the temperature distribution on the evaporator 509. Even in such a case, the period of the control to turn the compressor 501 on and off is short. Thus, a period in which the temperature Te of air blown out from the evaporator 509 is lower than the dew-point temperature Trt is short, resulting in a small amount of condensation water. As a result, the amount of water dissolving smell is also small, allowing the generation of a smell to be suppressed effectively.

SIXTEENTH EMBODIMENT

Figure 24:
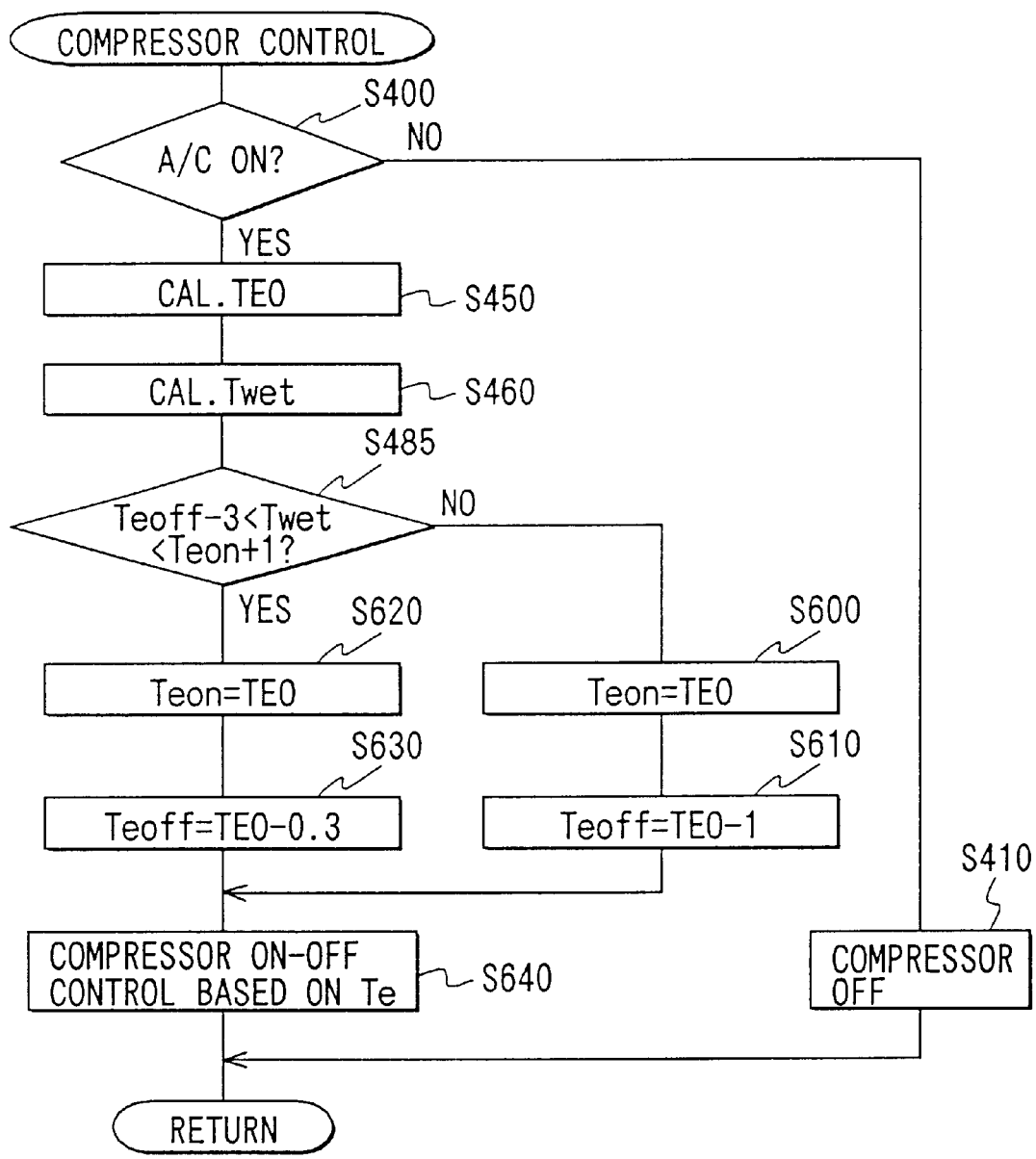
FIG. 24 is a flowchart representing compressor control (sixteenth embodiment)

A sixteenth embodiment is regarded as a modified version of the fifteenth embodiment so that only differences between them are explained with reference to a flowchart in FIG. 24. In the sixteenth embodiment, at a step S460 of the flowchart, the wet-bulb temperature Twet of air sucked by the evaporator 509 is computed from a psychometric chart, a temperature Tin of the air sucked by the evaporator 509 and a relative humidity RHi of the air sucked by the evaporator 509.

The flow of the control then advances to a step S485 to determine whether the wet-bulb temperature Twet is in a range of variations in evaporator outlet air temperature Te in order to determine whether a condition in which a smell may be generated prevails. For example, the wet-bulb temperature Twet is examined to determine whether the wet-bulb temperature Twet is higher than (Teoff−3° C.) but lower than (Teon+1° C.) where notation Teoff is a temperature to turn off the compressor 501 and notation Teon is a temperature to turn on the compressor 501.

In the present embodiment, the lower limit of a range of variations in evaporator outlet air temperature Te is set at (Teoff−3° C.). This is because, when the compressor 501 is turned off at Teoff (=TEO−1° C.), an undershoot of about 3° C. occurs in the temperature of the surfaces of evaporator fins due to response characteristics of the temperature sensor 532 and the refrigeration cycle R. On the other hand, the upper limit of the range of variations in evaporator outlet air temperature Te is set at (Teon+1° C.). This is because, when the compressor 501 is turned on, an overshoot of about 1° C occurs in the temperature of the surfaces of evaporator fins due to the response-characteristic problem.

In this way, when the wet-bulb temperature Twet is within the range of variations in evaporator outlet air temperature Te caused by the control to turn the compressor 501 on and off, the actual temperature Te of air blown out from the evaporator 509 decreases to a value lower than the dew-point temperature Trt, causing condensation water to be generated. The condensation water puts the evaporator 509 in a wet state. When the actual temperature Te of air blown out from the evaporator 509 exceeds the wet-bulb temperature Twet, on the other hand, the condensation water evaporates. The wet state of the evaporator 509 and the evaporation of condensation water from the evaporator 509 are repeated, leading to determination of a condition in which a smell is generated from the evaporator 509.

Thus, when the result of determination obtained at the step S485 is YES, the flow of the control goes on to steps S620 and S630. At the step S630, the temperature Teoff to turn off the compressor 501 is raised to (TEO−0.3° C.) in order to reduce the hysteresis width to 0.3° C. As a result, it is possible to obtain the same effects as the fifteenth embodiment.

SEVENTEENTH EMBODIMENT

Figure 25:
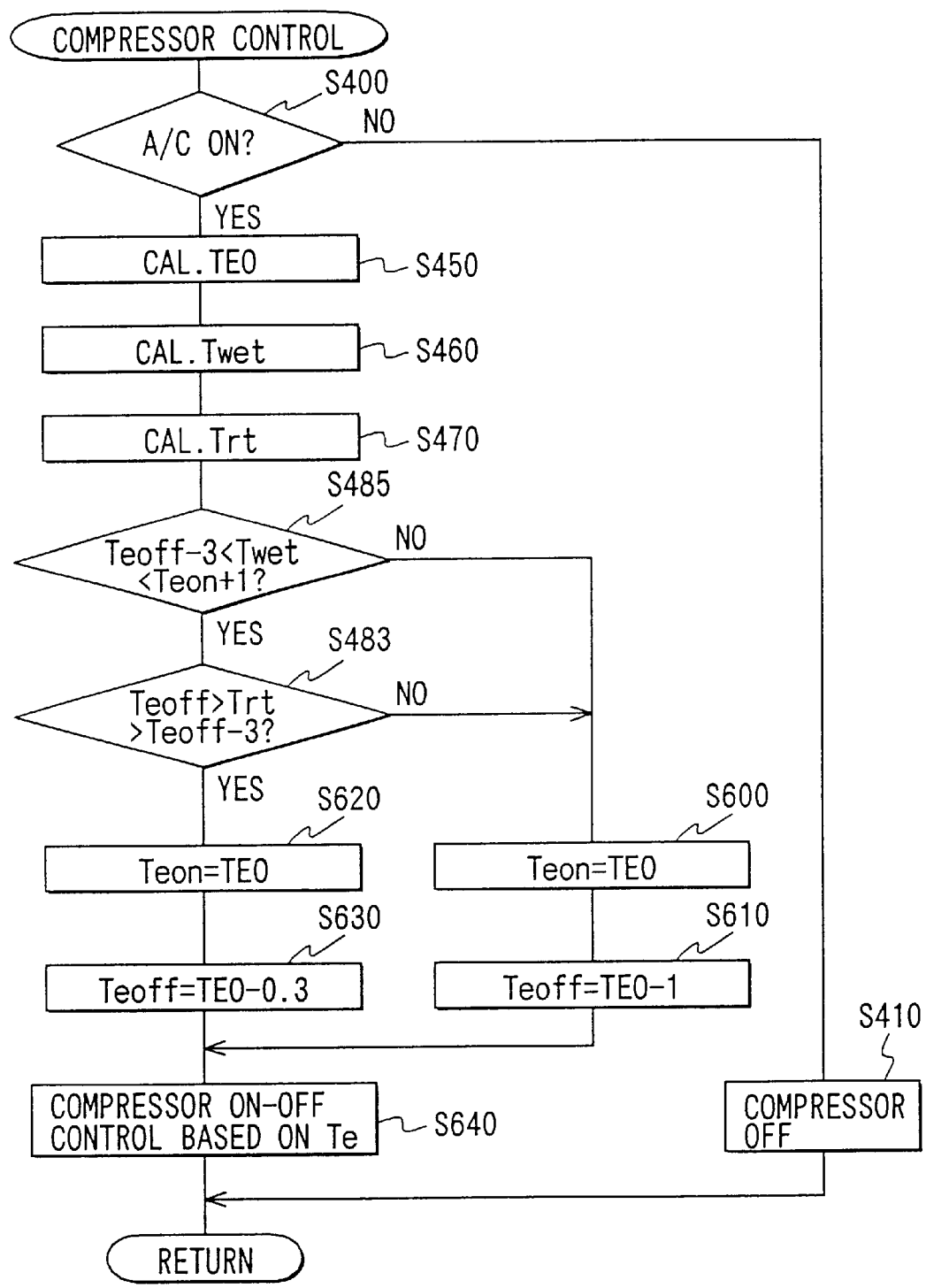
FIG. 25 is a flowchart representing compressor control (seventeenth embodiment)

FIG. 25 is a flowchart representing control executed according to a seventeenth embodiment. The seventeenth embodiment combines the step S470 for computing the dew-point temperature Trt and the determination step S483, which are included in the flowchart representing the control executed in accordance with the fifteenth embodiment, as well as the step S460 for computing the wet-bulb temperature Twet and the determination step S485, which are included in the flowchart representing the control executed in accordance with the sixteenth embodiment.

According to the seventeenth embodiment, the wet-bulb temperature Twet and the dew-point temperature Trt are verified to be within a predetermined range of variations in evaporator outlet air temperature Te caused by the control to turn the compressor 501 on and off at the steps S485 and S483 respectively in order to determine the existence of a condition in which a smell is generated from the evaporator 509. As a result, the existence of a condition in which a smell is generated from the evaporator 509 can be determined with a high degree of precision.

EIGHTEENTH EMBODIMENT

In the case of the fifteenth through seventeenth embodiments, if a result of determination obtained at the steps S483 and/or S485 indicates a condition in which a smell is generated from the evaporator 509, at the step S630, the temperature Teoff to turn off the compressor 501 is raised to (TEO−0.3° C.) in order to reduce the hysteresis width to 0.3° C. In the case of an eighteenth embodiment, on the contrary, the temperature Teon to turn on the compressor 501 is reduced to a value lower than TEO in order to reduce the hysteresis width.

Figure 26:
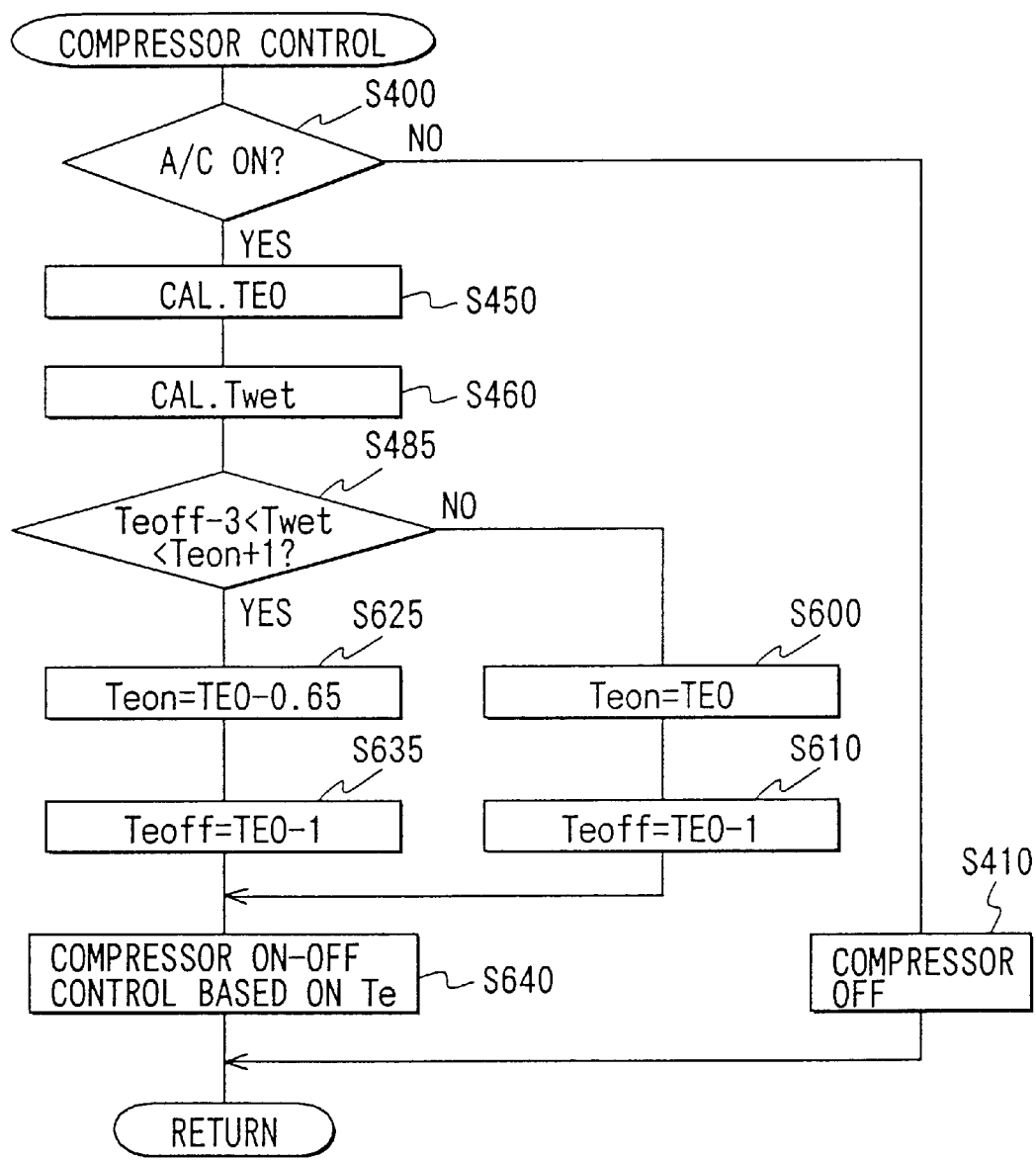
FIG. 26 is a flowchart representing compressor control (eighteenth embodiment)

The eighteenth embodiment is explained in more detail with reference to a flowchart shown in FIG. 26. The pieces of processing carried out at the steps S400 to S485 are the same as their respective counterparts in the flowchart shown in FIG. 24. If the result of the decision based on the wet-bulb temperature Twet at the step S485 indicates the existence of a condition in which a smell is generated from the evaporator 509, the flow of the control goes on to a step S625 at which the temperature Teon to turn on the compressor 501 is reduced to (TEO−0.65° C). At the next step S635, on the other hand, the temperature Teoff to turn off the compressor 501 is set at (TEO−1° C.) which is the same as the value set at the step S610 for the normal control of the compressor 501.

Figure 27:
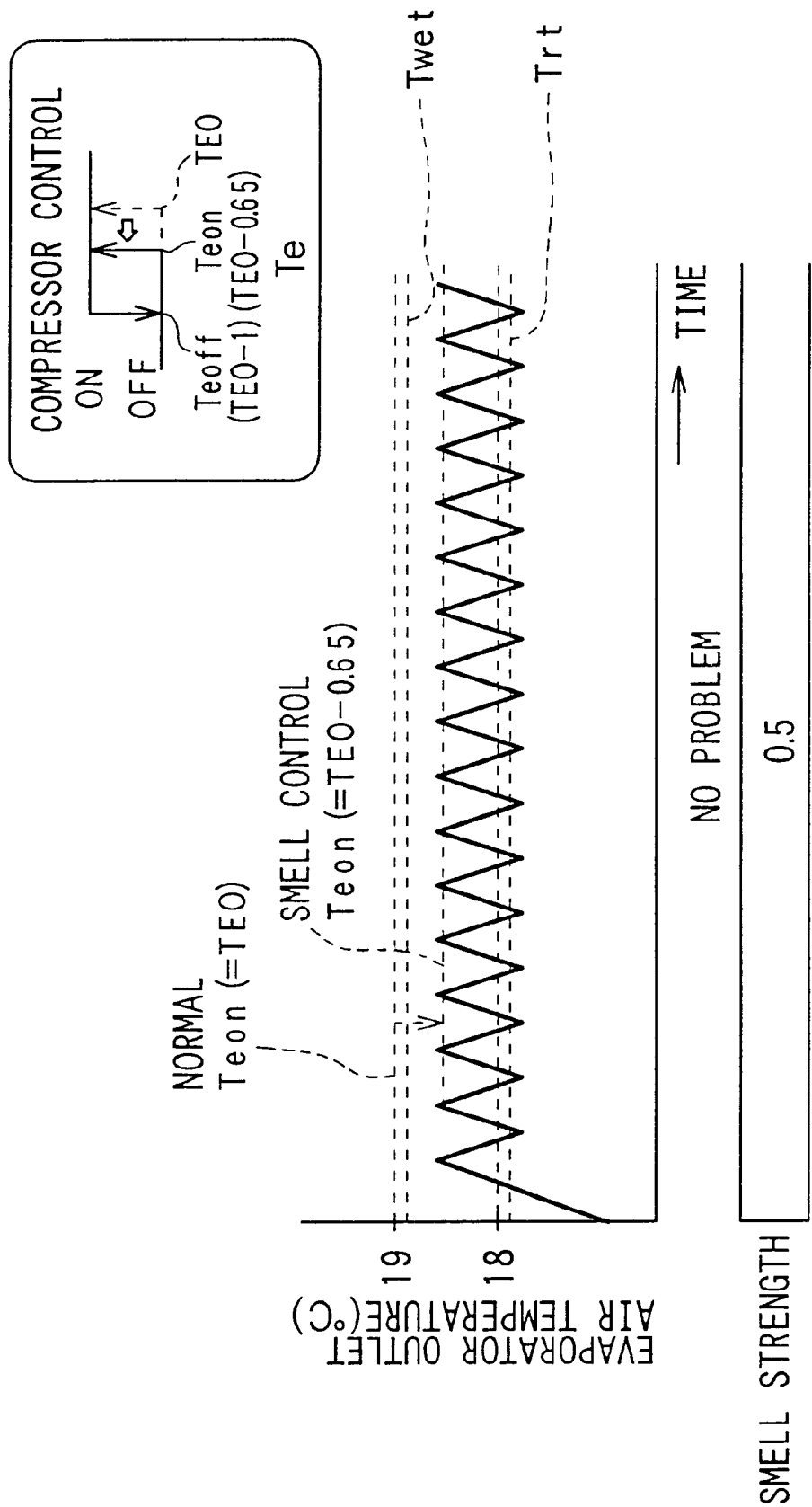
FIG. 27 is an explanatory diagram showing the operation of compressor control (eighteenth embodiment)

FIG. 27 is an explanatory diagram showing the control executed in accordance with the eighteenth embodiment. In order to deal with a smell, the temperature Teon to turn on the compressor 501 is reduced to decrease the hysteresis width of the control to turn the compressor 501 on and off to 0.35° C. As a result, the upper limit of the temperature Te of air blown out by the evaporator 509 becomes lower than the wet-bulb temperature Twet, causing no complete drying of the evaporator 509 due to complete evaporation of condensation water. In other words, condensation water keeps the evaporator 509 in a wet state, allowing a smell to be prevented from being generated from the evaporator 509.

NINETEENTH EMBODIMENT

In the case of the fifteenth through eighteenth embodiments, in order to deal with a smell, the hysteresis width of the control to turn the compressor 501 on and off is reduced. As a result, the period of the control to turn the compressor 501 on and off also becomes shorter. In the case of a nineteenth embodiment, however, the on period of the compressor 501 is directly limited to a predetermined time duration measured by using a timer means. As a result, the period of the control to turn the compressor 501 on and off also becomes shorter, allowing generation of a smell to be suppressed.

Figure 28:
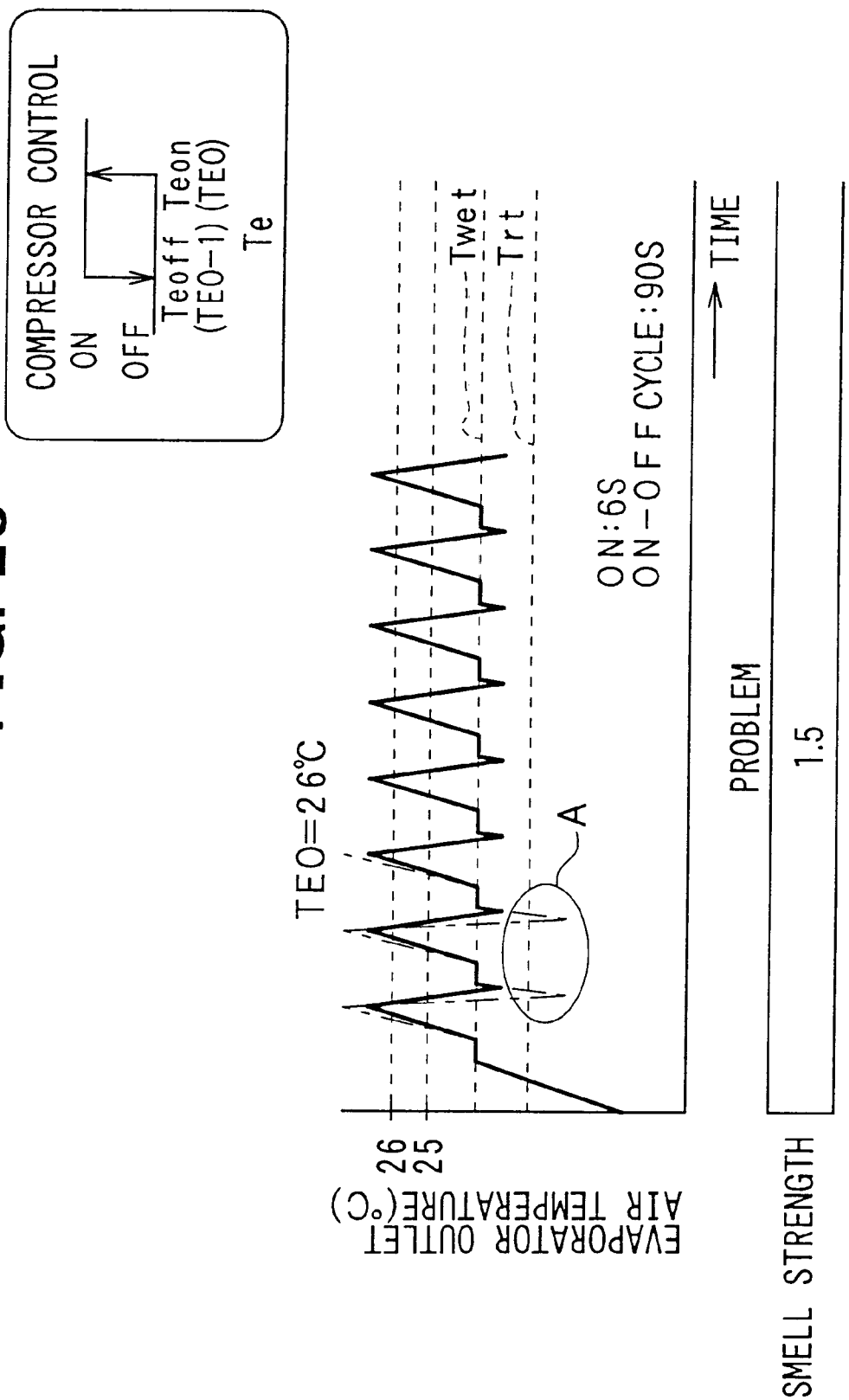
FIG. 28 is an explanatory diagram showing the operation of compressor control according to a related art corresponding to the eighteenth embodiment.

Details of the nineteenth embodiment are explained with reference to FIG. 28. FIG. 28 shows a case in which the target evaporator temperature TEO is increased to a very high temperature level of 26° C. A solid line shown in the figure represents variations in evaporator outlet temperature Te, which are detected by the temperature sensor 532. On the other hand, a single-dotted line represents variations in evaporator fins surface temperature. Since the target evaporator temperature TEO is increased to a very high temperature level of 26° C., the temperature Te of air blown out from the evaporator 509 and the temperature of fin surfaces of the evaporator 509 tend to greatly undershoot when the compressor 501 is turned on. FIG. 28 is an explanatory diagram showing the traditional case in which the hysteresis width of the control to turn the compressor 501 on and off is kept at 1° C. all the time. As a result, a 6-second on period of the compressor 501 is obtained within an on-off period of 90 seconds. An undershoot of the evaporator fins surface temperature reduces the temperature of the fin surfaces of the evaporator 509 to a value lower than the dew-point temperature Trt as indicated by an A portion shown in the figure, resulting in condensation water.

Then, when the compressor 501 is turned off, the temperature Te of air blown out from the evaporator 509 and the temperature of fin surfaces of the evaporator 509 increase to a value much higher than the wet-bulb temperature Twet. As a result, since the condensation water completely evaporates in the so-called complete drying process, wet and dry states prevail alternately and repeatedly on the surface of the evaporator 509 due to generation and evaporation of condensation water, causing a smell to be generated.

Particularly, in a range of high TEO temperatures, the temperature of fin surfaces of the evaporator 509 decreases due to the on operation of the compressor 501. However, the evaporator outlet air temperature Te detected by the temperature sensor 532 decreases, lagging behind the temperature of fin surfaces of the evaporator 509 due to a sensor response delay. For this reason, there is observed a phenomenon in which the on period of the compressor 501 is prolonged transiently for an actual decrease in evaporator fin surface temperature. This phenomenon further promotes the undershooting of the evaporator fin surface temperature.

The nineteenth embodiment recognizes a temperature range of high TEO values, forcibly limiting the on period of the compressor 501 to a predetermined time duration measured by using a timer means.

Figure 29:
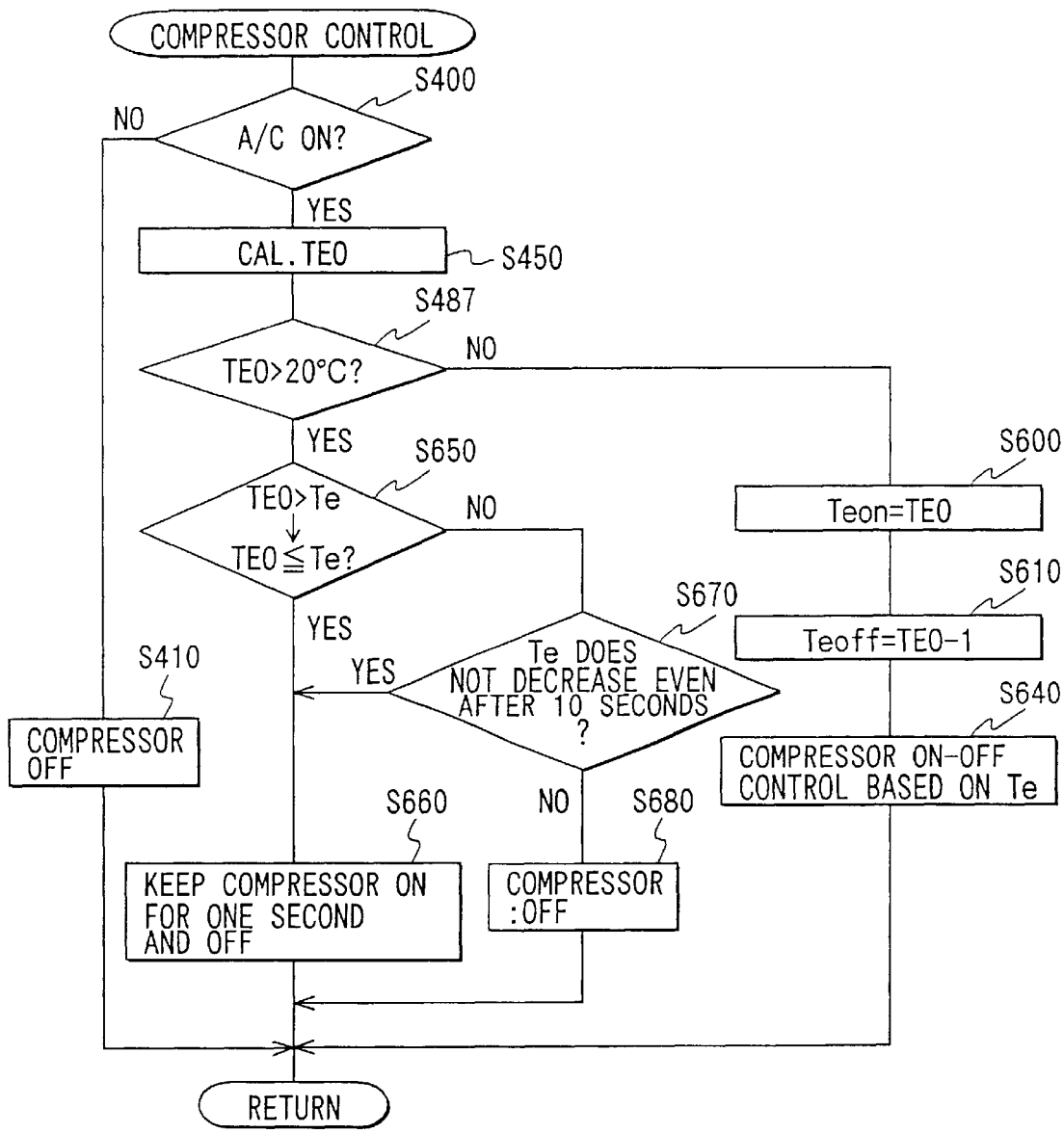
FIG. 29 is a flowchart representing compressor control (nineteenth embodiment)

The nineteenth embodiment is explained with reference to a flowchart in FIG. 29. Pieces of processing carried out at steps S400, S410 and S450 are the same as their respective counterparts in the embodiments explained previously. The flow of the control advances from the step S450 to a step S487 to determine whether the target evaporator temperature TEO is in the high temperature range. For example, the target evaporator temperature TEO is examined to determine whether TEO>20° C. If the target evaporator temperature TEO is higher than 20° C., the target evaporator temperature TEO is determined to be in the high temperature range.

Figure 30:
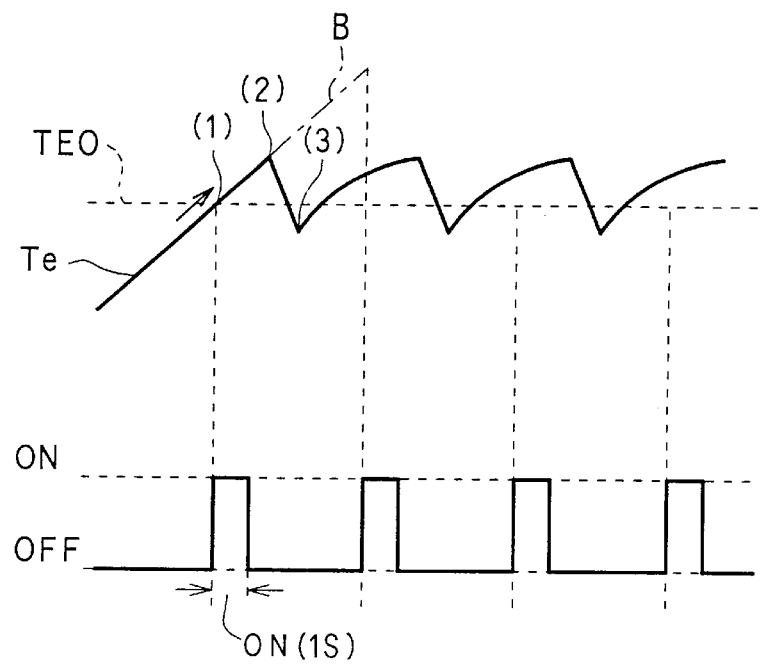
FIG. 30 is an explanatory diagram showing the operation of compressor control (nineteenth embodiment)

If the result of determination obtained at the step S487 is YES, the flow of the control advances to a step S650 to determine whether the temperature Te of air blown out from the evaporator 509 has passed through a point (1) shown in FIG. 30. That is, the temperature Te of air blown out from the evaporator 509 is examined to determine whether the temperature Te has changed from a value lower than the target evaporator temperature TEO (Te<TEO) to a value at least equal to the target evaporator temperature TEO (Te≧TEO). If the result of determination obtained at the step S350 is YES, the flow of the control goes on to a step S660 at which the compressor 501 is kept in on state for a predetermined period of typically one second before being turned off.

While the on period of the compressor 501 is short, the temperature Te of air blown out from the evaporator 509 keeps increasing for some time due to response characteristics of the temperature sensor 532 and the refrigeration cycle R. Thereafter, the temperature Te of air blown out from the evaporator 509 starts declining at a point (2) shown in FIG. 30, which is a point of time at which the compressor 501 is turned off. After some time has lapsed since the point (2), at a point (3) shown in FIG. 30, the temperature Te of air blown out from the evaporator 509 again increases.

If the result of determination obtained at the step S650 indicates that the temperature Te of air blown out from the evaporator 509 has not passed through the point (1) shown in FIG. 30, on the other hand, the flow of the control advances to a step S670 to determine whether the temperature Te of air blown out from the evaporator 509 has not decreased even after a predetermined period of time has lapsed since the point (1) at which the compressor 501 is turned on as shown in FIG. 30. The predetermined period of time is a period longer than the on period of the compressor 501. The period of time is typically 10 seconds.

Normally, if the compressor 501 is turned on, the temperature Te of air blown out from the evaporator 509 changes from the point (2) to the point (3) as shown in FIG. 30, resulting in a NO result of determination at the step S670. At the. next step S680, the compressor 501 is kept in the off state.

If the temperature Te of air blown out from the evaporator 509 keeps rising from the point (2) as shown by a single-dotted line B in FIG. 30 for some reasons, the result of determination obtained at the step S670 is YES. In this case, the flow of the control advances to a step S660 at which the compressor 501 is turned on for a period of one second.

Figure 31:
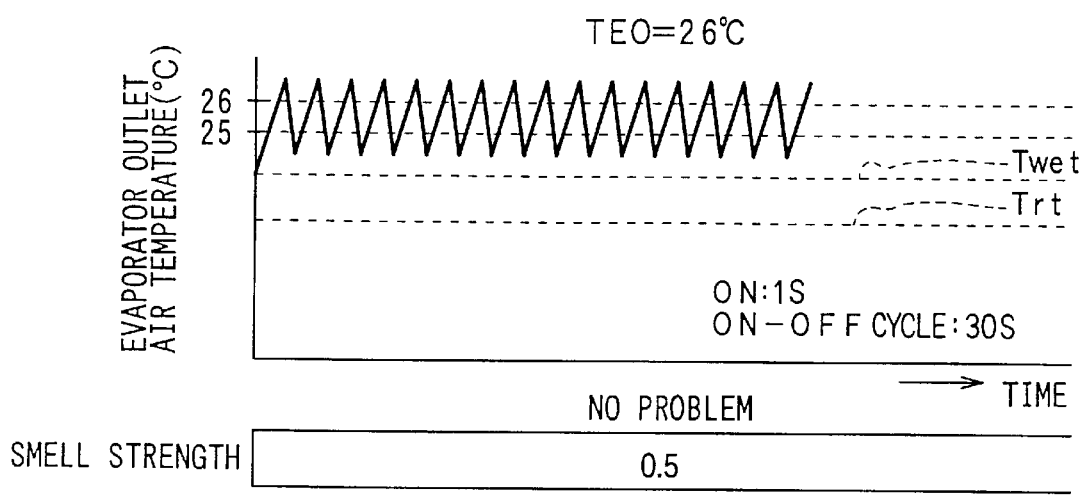
FIG. 31 is an explanatory diagram showing the operation of compressor control (nineteenth embodiment)

The above control turns on the compressor 501 for a period of one second each time the point (1) shown in FIG. 30 is passed through. As a result, in the case of the nineteenth embodiment, for TEO=26° C., the lower limit of the temperature Te of air blown out from the evaporator 509 can be sustained at a value higher than the wet-bulb temperature Twet as shown in FIG. 31 by forcibly restricting the on period of the compressor 501.

In addition, according to the nineteenth embodiment, it is possible to execute control to suppress generation of a smell from the evaporator 509 without detecting the temperature and the humidity of air sucked by the evaporator 509. Thus, the number of sensors can be reduced. As a result, the cost can also be reduced to provide much convenience in practical use.

TWENTIETH EMBODIMENT

There has been explained the case of the nineteenth, in which the on period of the computer is fixed at one second. It should be noted, however, that the on period of the compressor 501 in a twentieth embodiment is lengthened by an increase in thermal load. In the case of the twentieth embodiment, the greater thermal load borne by the evaporator 509, the lower the value obtained as a result of computation of the target evaporator temperature TEO.

In the twentieth embodiment, assume for example that TEO is computed to be 25° C. for a compressor on period of one second, 20° C. for a compressor on period of 1.5 seconds and 15° C. for a compressor on period of two seconds.

In the twentieth embodiment, assume for example that a criterion value for the target evaporator temperature TEO is 13° C. In this case, temperatures higher than 13° C. are regarded as temperatures in the high-temperature range.

The TEO high-temperature range in the nineteenth and twentieth embodiments is in a word a range of TEO temperatures at which the off period of the compressor 501 causes the temperature Te of air blown out from the evaporator 509 to increase to a value higher than the wet-bulb temperature Twet of air sucked by the evaporator 509, satisfying a condition in which condensation water can evaporate completely. It is thus desirable to change the criterion value of the high-temperature range in dependence on the region in which the air-conditioning apparatus is used. In addition, the criterion value of the high-temperature range can be changed in dependence on the season in which the air-conditioning apparatus is used.

TWENTY-FIRST EMBODIMENT

According to the twenty-first embodiment, the compressor 501 is driven in an intermittent-operation mode in which the compressor 501 is operated for a short period of time intermittently at predetermined time intervals so as to further increase the effect of power saving of the compressor driver (or the vehicle engine 504) while suppressing generation of a smell from the evaporator 509.

Figure 34:
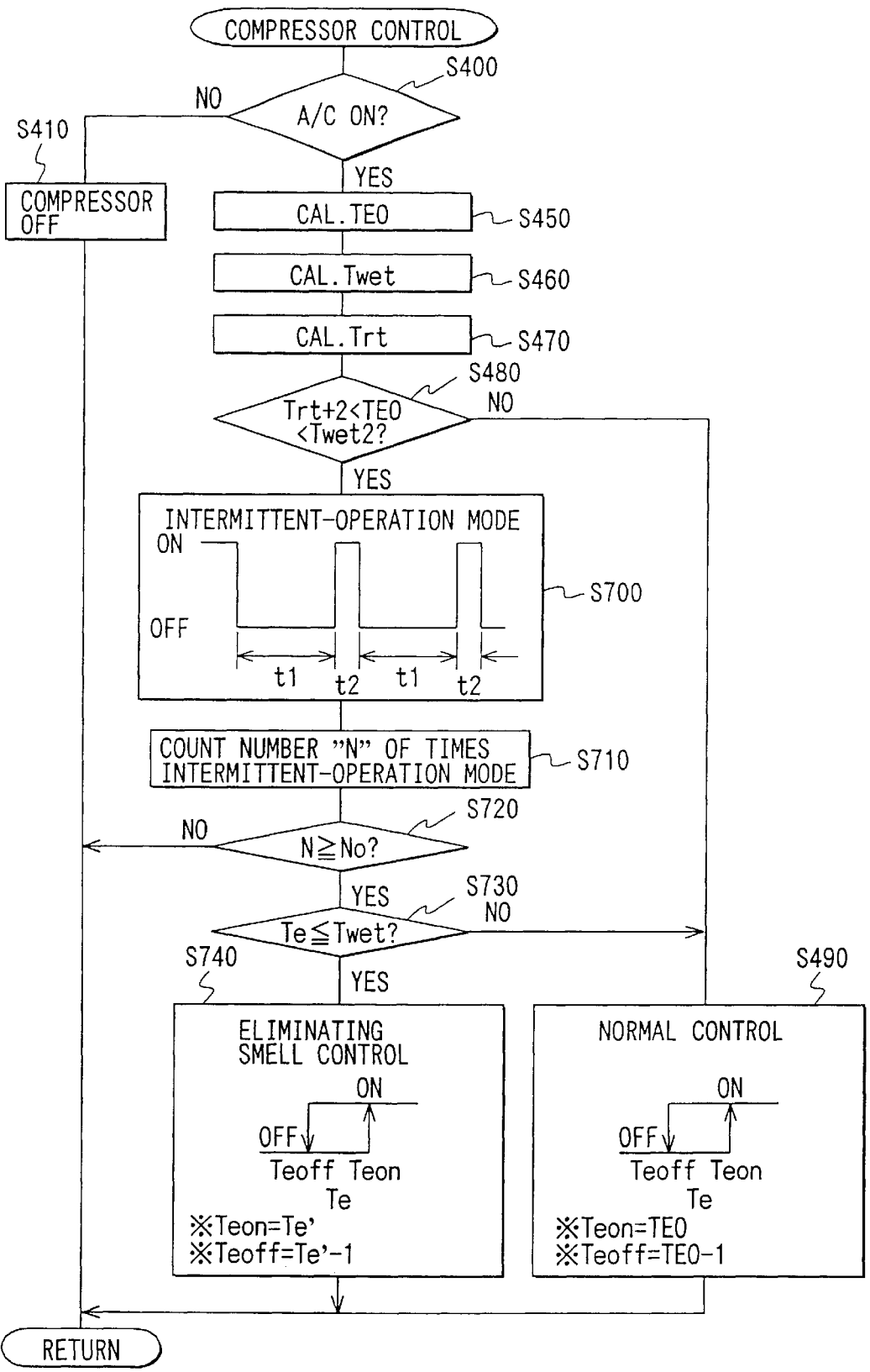
FIG. 34 is a flowchart representing compressor control (twenty-first embodiment)

FIG. 34 is a flowchart representing compressor control executed in the twenty-first embodiment. Pieces of processing carried out at steps S400, S410 and S450 to S490 are the same as their respective counterparts in the embodiments explained previously.

With the air-conditioning switch 538e (shown in FIG. 8) turned on, the pieces of processing carried out at the steps S450 through S480, which are the same as their respective counterparts in the eleventh embodiment, are executed. A computation of the target evaporator temperature TEO carried out at the step S450 can be determined based on only the target evaporator temperature TEO1 computed at the step S420 of the flowchart shown in FIG. 10 from the target outlet air temperature TAO to be used for room temperature control. It should be noted, however, that much like the first embodiment, in addition to the target evaporator temperature TEO1 for room temperature control, the target evaporator temperature TEO2 computed at the step S430 of the flowchart shown in FIG. 10 to be used for in-vehicle humidity control and the target evaporator temperature TEO3 computed at the step S440 of the flowchart shown in FIG. 10 to be used for room temperature control can also be found. Then, the smallest value among TEO, TEO2 and TEO3 is used as the eventual target evaporator temperature TEO.

The flow of the control then goes on to a step S480 to determine whether the target evaporator temperature TEO has been set at a value close to the wet-bulb temperature Twet and the dew-point temperature Trt in order to determine the existence of a condition in which a smell may be generated from the evaporator 509. If the result of determination obtained at the step S480 is YES, the flow of the control advances to a step S700 to execute the intermittent-operation mode in which the compressor 501 is operated for a short period of time intermittently at predetermined time intervals.

At the step S700, first of all, the compressor 501 is halted for a first predetermined period t1 measured by a first timer means. Then, the compressor 501 is operated for a second predetermined period t2 measured by a second timer means. These operations are carried out repeatedly. During the short second period t2 of typically one second, the compressor 501 is running to reduce a drying speed at which the number of portions put in a wet state by condensation water existing on the surface of the evaporator 509 or at which the surface of the evaporator 509 becomes dry.

On the other hand, the first predetermined period t1 is much longer than the second predetermined period t2. The first predetermined period t1 is typically 30 seconds. Thus, the availability factor of the compressor 501 decreases. As a result, a maximum effect of the power saving is exhibited.

In the intermittent-operation mode, generation of a smell from the evaporator 509 is suppressed for the following reason. Under a normal cooling operation condition, by properly. setting a halted-compressor period, that is, the length of the second predetermined period t2, in the intermittent-operation mode, evaporation of condensation water from the surface of the evaporator 509 proceeds gradually, the number of wet portions on the surface of the evaporator 509 decreases gradually and, as a result, the surface of the evaporator 509 becomes dry up gradually.

At that time, a temperature distribution inevitably results on the surface of the evaporator 509 due to non-uniformity of a refrigerant evaporation amount. Thus, the number of portions with condensation water evaporating completely increases gradually at different locations. Therefore, a smell component disperses and departs from the surface of the evaporator 509 little by little. As a result, the intermittent-operation mode allows the smell strength to be suppressed to a low level and prevents the noise strength from rising to a level at which passengers feel uncomfortable.

At the next step S710, the number of times the intermittent-operation mode executed at the step S700 is counted. Specifically, it is also possible to count the number of first predetermined periods t1 during which the compressor 501 is halted, the number of second predetermined periods t2 during which the compressor 501 is operating or the number of times a cycle (=the first predetermined period t1+the second predetermined period t2) of the intermittent-operation mode is repeated.

The flow of the control then advances to next step S720 to determine whether the number of times the intermittent-operation mode is executed becomes equal to at least a predetermined value of typically ten. If the number of times the intermittent-operation mode is executed becomes equal to at least the predetermined value, the flow of the control advances to a step S730 to determine whether the temperature Te of air blown out from the evaporator 509 becomes lower than the wet-bulb temperature Twet after the intermittent-operation mode has been executed a number of times indicated by the predetermined value.

Figure 35:
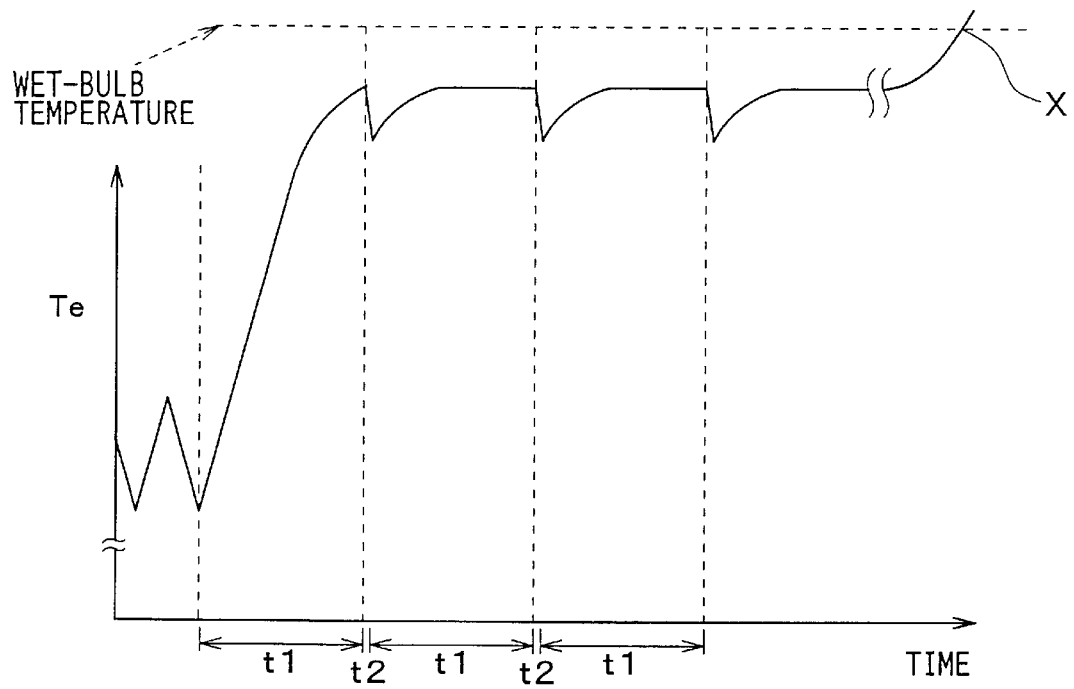
FIG. 35 is a diagram showing a characteristic representing variations in evaporator outlet air temperature in an intermittent-operation mode (twenty-first embodiment).

Under a normal cooling operation condition, execution of the intermittent-operation mode allows the surface of the evaporator 509 to become dry gradually as described above. Thus, after the intermittent-operation mode is executed a predetermined number of times such as typically ten times for example, condensation water completely evaporates from the surface of the evaporator 509 and the temperature Te of air blown out from the evaporator 509 increases to a value higher than the wet-bulb temperature Twet like an X point shown in FIG. 35.

In a state where condensation water completely evaporates from the surface of the evaporator 509 and the temperature Te of air blown out from the evaporator 509 increases to a value higher than the wet-bulb temperature Twet as described above, no smell is generated from the surface of the evaporator 509. Thus, the flow of the control flows from the step S730 to a step S490 at which the normal control of the compressor 501 is executed.

If the temperature of air sucked by the evaporator 509 is extremely low or in some other states, the amount of evaporated condensation water is small. Thus, even after the intermittent-operation mode is executed a predetermined number of times such as typically ten times, the wet state of the surface of the evaporator 509 due to the condensation water is sustained, and it is thus quite within the bounds of possibility that a relation Te≦Twet is maintained where notation Te denotes the temperature of air blown out from the evaporator 509 and notation Twet denotes the wet-bulb temperature. In this case, the result of determination obtained at the step S730 is YES, causing the flow of the control to advance to a step S740 at which the control of the compressor 501 to suppress a smell is executed.

That is, the compressor control executed at the step S740 is control to alternately interrupt and resume the operation of the compressor 501 by using a temperature Te' used as the target temperature Teon to turn on the compressor 501 and by setting the target temperature Teoff to turn off the compressor 501 at (Te'–1)°C. where the temperature Te' is an evaporator outlet air temperature Te which is detected right after the intermittent-operation mode has been executed a predetermined number of times such as typically ten times as indicated by a YES result of determination obtained at the step S720. Specifically, the compressor control executed at the step S740 is control to alternately interrupt and resume the operation of the compressor 501 after setting the target evaporator temperature TEO at an evaporator outlet air temperature Te' which is detected right after the intermittent-operation mode has been executed the predetermined number of times.

The compressor control executed at the step S740 controls the temperature Te of air blown out from the evaporator 509 to a value lower than the wet-bulb temperature Twet, allowing generation of a smell from the evaporator 509 to be suppressed.

In addition, at a temperature equal to (Te'–1)°C. which is higher than the dew-point temperature Trt, the compressor 501 is turned off. Thus, in comparison with a case in which the compressor 501 is turned off at a temperature not exceeding the dew-point temperature Trt, the availability factor of the compressor 501 is suppressed to a low value which allows the effect of power saving to be exhibited.

In the intermittent-operation mode executed at the step S700, a special intermittent operation including an operating state of the compressor for a very short period t2 is carried out repeatedly. It is undesirable to continue the repetition of such an intermittent operation for a long period of time if the operating condition of the vehicle engine 504 is taken into consideration. In the present embodiment, however, as the number of times the intermittent-operation mode is executed exceeds a predetermined number, the execution of the intermittent-operation mode at the step S700 is discontinued and then either the normal control of the compressor 501 is executed at the step S490 or the compressor control to suppress generation of a smell is executed at the step S740. In either case, the compressor operating period and the compressor pause period are both extended by a hysteresis width between the target temperatures Teon and Teoff to give an operating condition suitable for the vehicle engine 504.

Here, if the result of determination obtained at the step S480 is NO, the flow of the control also goes on to a step S490 at which the normal control of the compressor 501 is executed. This is because no smell is generated from the surface of the evaporator 509.

As described above, the target temperature Teon is set at Te' in the compressor control executed at the step S740. It is worth noting, however, that the control of the compressor 501 can also be executed with the target temperatures Teon and Teoff set at the wet-bulb temperature Twet and a temperature equal to (Twet–1° C.) respectively to give the same effects.

MODIFICATIONS

It should be noted that this invention is not limited to the embodiments explained above and may be a combination of the second to seventh embodiments.

In the first embodiment, the intermittent operation mode is stopped when the after-evaporation temperature TE is higher than the wet-bulb temperature Twet. With a comparison between the after-evaporation temperature TE and the wet-bulb temperature Twet abolished, the intermittent operation mode may be constantly performed while the A/C switch is in on position and the engine 110 stops.

In the embodiment stated above, during the inside-air circulation mode, the wet-bulb temperature Twet is operated (computed) based on the detected values of the inside temperature sensor 261 and the humidity sensor and the wet air diagram. During the outside-air introduction mode, the wet-bulb temperature Twet was the after-evaporation temperature TE after the lapse of the predetermined time (30 seconds in this embodiment) after the compressor 231 (engine 110) stops. It is understood, however, that this invention is not limited thereto and the wet-bulb temperature Twet may be determined by other means, for example based on the introduced air temperature, not in the outside-air introduction mode and the inside-air circulation mode, or may be either lower temperature of the after-evaporation temperature TE immediately after the stop of the compressor 231 (engine 110) and the detected temperature of the outside-air temperature sensor 262.

Furthermore, the application of this invention is not limited to hybrid vehicles and economy-run vehicles and may be applied to other general vehicles.

Furthermore, in the above-described embodiment the elapsed time To was about 30 seconds. It should be noted, however, that this invention is not limited thereto and may be 20 seconds or more and 90 seconds or less, and preferably 20 seconds or more and 60 seconds or less.

Furthermore, in the above-described embodiment the required operation time Ts was about 1 second; this invention, however, is not limited thereto and may be 0.5 second or more and 5 seconds or less, and preferably 0.5 seconds or more and 2 seconds or less.

While the above-described embodiments refer to examples of usage of the present invention, it is understood that the present invention may be applied to other usage, modifications and variations of the same, and is not limited to the disclosure provided herein.

In the eleventh through eighteenth embodiments, the temperature sensor 539 and the humidity sensor 540, which are provided at the inlet side of the evaporator 509, detects inlet air temperature Tin and humidity RHi respectively. It should be noted, however, that if an in-vehicle mode is set as an inlet mode of ambient/in-vehicle air, the evaporator inlet air temperature Tin and humidity RHi are about the same as respectively a room temperature Tr detected by the sensor 534 and an in-vehicle humidity RHr detected by the humidity sensor 533. Thus, the compressor control according to any one of the embodiments can be executed with a room temperature Tr detected by the sensor 534 and an in-vehicle humidity RHr detected by the humidity sensor 533 used as the evaporator inlet air temperature Tin and humidity Rin respectively.

In addition, the wet-bulb temperature Twet of air sucked by the evaporator 509 is the temperature Te of air blown out from the evaporator 509 during a period (2) shown in FIG. 32B. By the way, the temperature Te of air blown out from the evaporator 509 during the period (2) is a temperature which is reached after a predetermined period of typically thirty seconds has lapsed since the compressor 501 is switched from an on state to an off state. Thus, instead of computing the wet-bulb temperature Twet from the evaporator inlet air temperature Tin and humidity RHi, it is also possible to use the evaporator outlet air temperature Te, which is reached after a predetermined period has lapsed since the compressor 501 is switched from an on state to an off state, as an inferred value of the wet-bulb temperature Twet. This way of inferring the wet-bulb temperature Twet can also be applied to a case in which an ambient-air mode is set as the inlet mode of ambient/in-vehicle air and no ambient-air-humidity sensor is used.

Furthermore, in the above-described embodiments, the temperature sensor 532 for detecting the temperature Te of air blown out from the evaporator 509 is used as an evaporator-temperature-detecting sensor. It should be noted, however, that a sensor detecting the temperature of evaporator fins or the like also may be used as the evaporator-temperature-detecting sensor.

Moreover, the above embodiments explain a control to turn the compressor 501 on and off with the vehicle engine 504 operating or with the vehicle running. It is worth noting, however, that the present invention can also be applied to control to turn on and off the compressor in an echo-run car or a hybrid car with the car halted. An echo-run car is a car that automatically stops the car engine when the car is halted. On the other hand, a hybrid car is a car that has both an engine as well as an engine-driving electric motor, and also stops the car engine when the car is halted. Also in the case of echo-run and hybrid cars, the control according to the present invention allows the off period of the compressor to be prolonged effectively as well as effectively prevents a smell from being generated when the car is halted.

What is claimed is:

1. A vehicle air-conditioning system which has a compressor for compressing refrigerant and an evaporator mounted inside an air-conditioner casing, said casing forming a passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from an operation of the compressor being started; and means for executing an intermittent operation mode after the operation of the compressor is stopped, the compressor being intermittently operated by stopping the compressor until the time measured by the first clock means reaches a first predetermined time, and thereafter operating the compressor until the time measured by the second clock means reaches a second predetermined time which is shorter than the first predetermined time;

wherein the intermittent operation mode is stopped when a temperature of air passing through the evaporator has exceeded a wet-bulb temperature of the evaporator.

2. A vehicle air-conditioning system which has a compressor for compressing refrigerant and an evaporator mounted inside an air-conditioner casing, said air-conditioner case forming an air passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from the operation of the compressor being started; and control means for controlling the operation of the compressor so that the compressor is operated from when the time measured by the first clock means reaches a first predetermined time after the operation is stopped until the time measured by the second clock means reaches a second predetermined time that is shorter than the first predetermined time;

wherein the first predetermined time is increased according to the temperature rise of air introduced into the air-conditioner casing.

3. A vehicle air-conditioning system which has a compressor for compressing refrigerant and an evaporator mounted inside an air-conditioner casing, said air-conditioner case forming an air passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from the operation of the compressor being started; and control means for controlling the operation of the compressor so that the compressor is operated from when the time measured by the first clock means reaches a first predetermined time after the operation is stopped until the time measured by the second clock means reaches a second predetermined time that is shorter than the first predetermined time;

wherein the first predetermined time is increased according to an increase in a humidity of air introduced into the air-conditioner casing.

4. A vehicle air-conditioning system which has a compressor for compressing refrigerant and an evaporator mounted inside an air-conditioner casing, said air-conditioner case forming an air passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from the operation of the compressor being started; and control means for controlling the operation of the compressor so that the compressor is operated from when the time measured by the first clock means reaches a first predetermined time after the operation is stopped until the time measured by the second clock means reaches a second predetermined time that is shorter than the first predetermined time;

wherein the first predetermined time is increased with a decrease in a volume of air flowing in the air-conditioner casing.

5. A vehicle air-conditioning system which has a compressor for compressing refrigerant and an evaporator mounted inside an air-conditioner casing, said air-conditioner case forming an air passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from the operation of the compressor being started; and control means for controlling the operation of the compressor so that the compressor is operated from when the time measured by the first clock means reaches a first predetermined time after the operation is stopped until the time measured by the second clock means reaches a second predetermined time that is shorter than the first predetermined time;

wherein the first predetermined time is increased longer during an inside-air circulation mode in which inside air is introduced into the air-conditioner casing than in an outside-air introduction mode in which outside air is introduced into the air-conditioner casing.

6. A vehicle air-conditioning system according to claim 5, wherein the first predetermined time is decreased with an increase in the vehicle speed during the outside air introduction mode.

7. A vehicle air-conditioning system according to claim 5, wherein the first predetermined time is increased with a decrease in solar radiation entering the vehicle interior during the inside-air circulation mode.

8. A vehicle air-conditioning system which has a compressor for compressing refrigerant and an evaporator mounted inside an air-conditioner casing, said casing forming a passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from an operation of the compressor being started; and means for executing an intermittent operation mode after the operation of the compressor is stopped, the compressor being intermittently operated by stopping the compressor until the time measured by the first clock means reaches a first predetermined time, and thereafter operating the compressor until the time measured by the second clock means reaches a second predetermined time which is shorter than the first predetermined time;

wherein the compressor is driven by a driving source, the intermittent operation mode being stopped when the driving source stops.

9. A vehicle air-conditioning system which has a compressor for compressing refrigerant and an evaporator mounted inside an air-conditioner casing, said air-conditioner case forming an air passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from the operation of the compressor being started; and control means for controlling the operation of the compressor so that the compressor is operated from when the time measured by the first clock means reaches a first predetermined time after the operation is stopped until the time measured by the second clock means reaches a second predetermined time that is shorter than the first predetermined time;

evaporator detecting means for detecting the evaporator temperature; and wet bulb temperature detecting means for detecting wet-bulb temperature inside a vehicle compartment;

wherein the compressor is operated so that an evaporator temperature detected by the evaporator temperature detecting means becomes below a wet-bulb temperature detected by the wet-bulb temperature detecting means, after on/off operation mode starts, as well as when the compressor reaches a predetermined number of operation times.

10. A vehicle air-conditioning system which has a compressor for compressing refrigerant and an evaporator mounted inside an air-conditioner casing, said air-conditioner case forming an air passage to channel air into a vehicle interior, the air being cooled by evaporation of refrigerant in the evaporator, the vehicle air-conditioning system comprising:

first clock means for measuring a time from an operation of the compressor being stopped;

second clock means for measuring a time from the operation of the compressor being started; and control means for controlling the operation of the compressor so that the compressor is operated from when the time measured by the first clock means reaches a first predetermined time after the operation is stopped until the time measured by the second clock means reaches a second predetermined time that is shorter than the first predetermined time;

wherein the second predetermined time period is a duration of time when the refrigerant reaches only a part of the evaporator while the compressor is being turned ON for a same duration of time.

11. A vehicle air-conditioning system for cooling a vehicle interior, comprising:

an evaporator;

a compressor fluidly communicating with said evaporator through a cooling circuit;

a processor having a first clock operation and a second clock operation, said compressor operating or stopping in response to said processor;

an evaporator air outlet temperature sensor providing an evaporator outlet temperature signal to said processor;

a wet bulb temperature sensor that detects a wet bulb temperature inside said vehicle interior, said wet bulb temperature sensor providing a wet bulb temperature signal to said processor;

wherein said processor obtains a wet bulb temperature from said wet bulb temperature sensor at a predetermined time after said compressor stops operating, said processor instructing said compressor to operate for a predetermined time when said wet bulb temperature is lower than a temperature detected by said evaporator air outlet temperature sensor.

12. A vehicle air-conditioning system having a compressor driven by a driving source and controlled to be turned on and off in accordance with a condition related to an air conditioning, and an evaporator for cooling air supplied to a vehicle interior by evaporating a refrigerant compressed by the compressor, the vehicle air-conditioning system comprising:

a first controller which turns off the compressor in response to a condition except for the air conditioning; and a second controller which turns on the compressor when a first predetermined time is elapsed from the compressor is turned off by the first controller, and thereafter turns off the compressor when a second predetermined time shorter than the first predetermined time is elapsed from the compressor is turned on;

wherein the first predetermined time and the second predetermined time is determined to allow an increase of a temperature of the evaporator but to keep the evaporator wet longer.

13. The vehicle air-conditioning system according to claim 12, wherein the first controller turns off the compressor by stopping the driving source.

* * * * *